June 29, 1954   C. Z. MONROE ET AL   2,682,208
CARTON CONVERTING MACHINE
Filed April 15, 1948   18 Sheets-Sheet 1
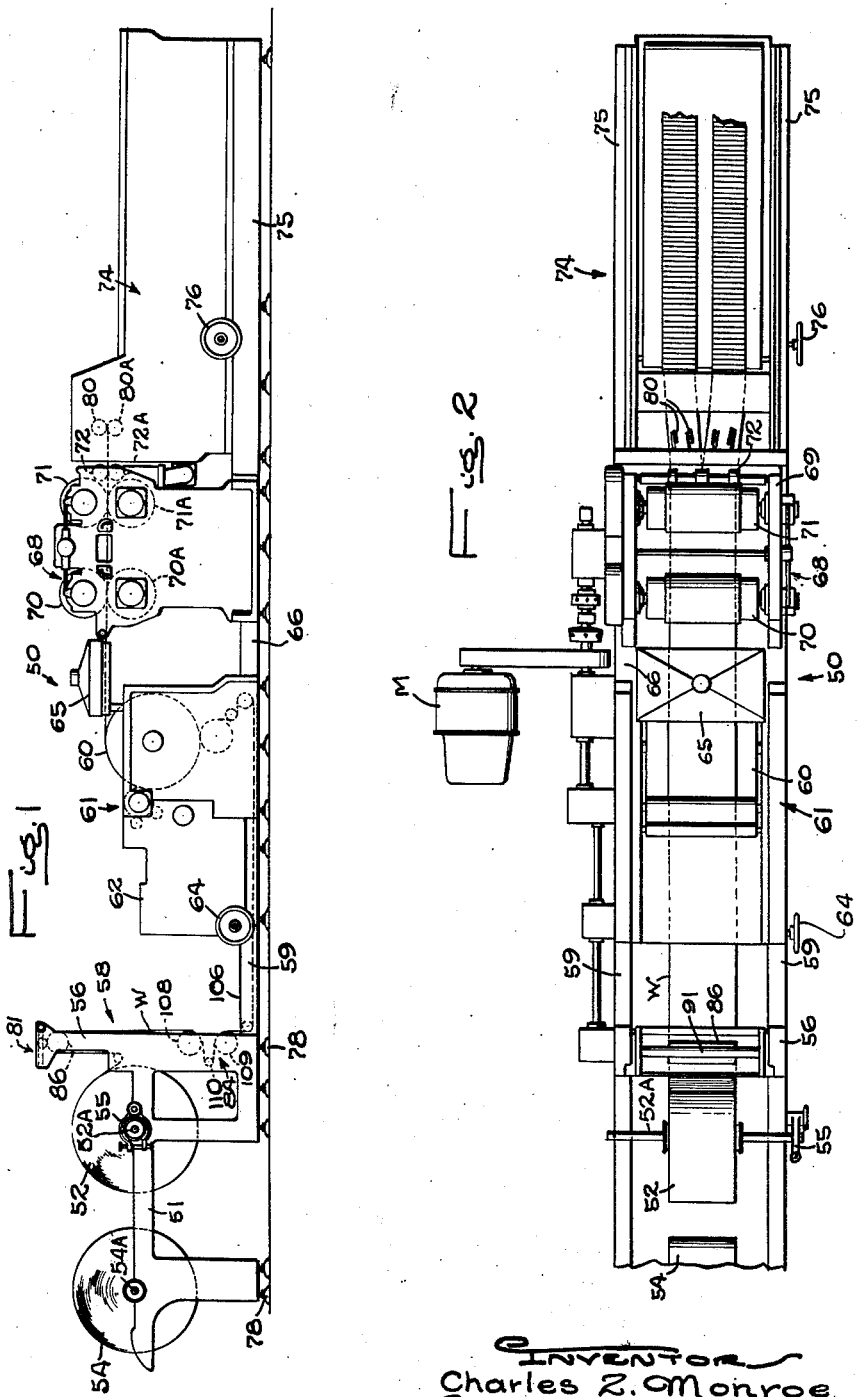

June 29, 1954    C. Z. MONROE ET AL    2,682,208
CARTON CONVERTING MACHINE
Filed April 15, 1948          18 Sheets—Sheet 2
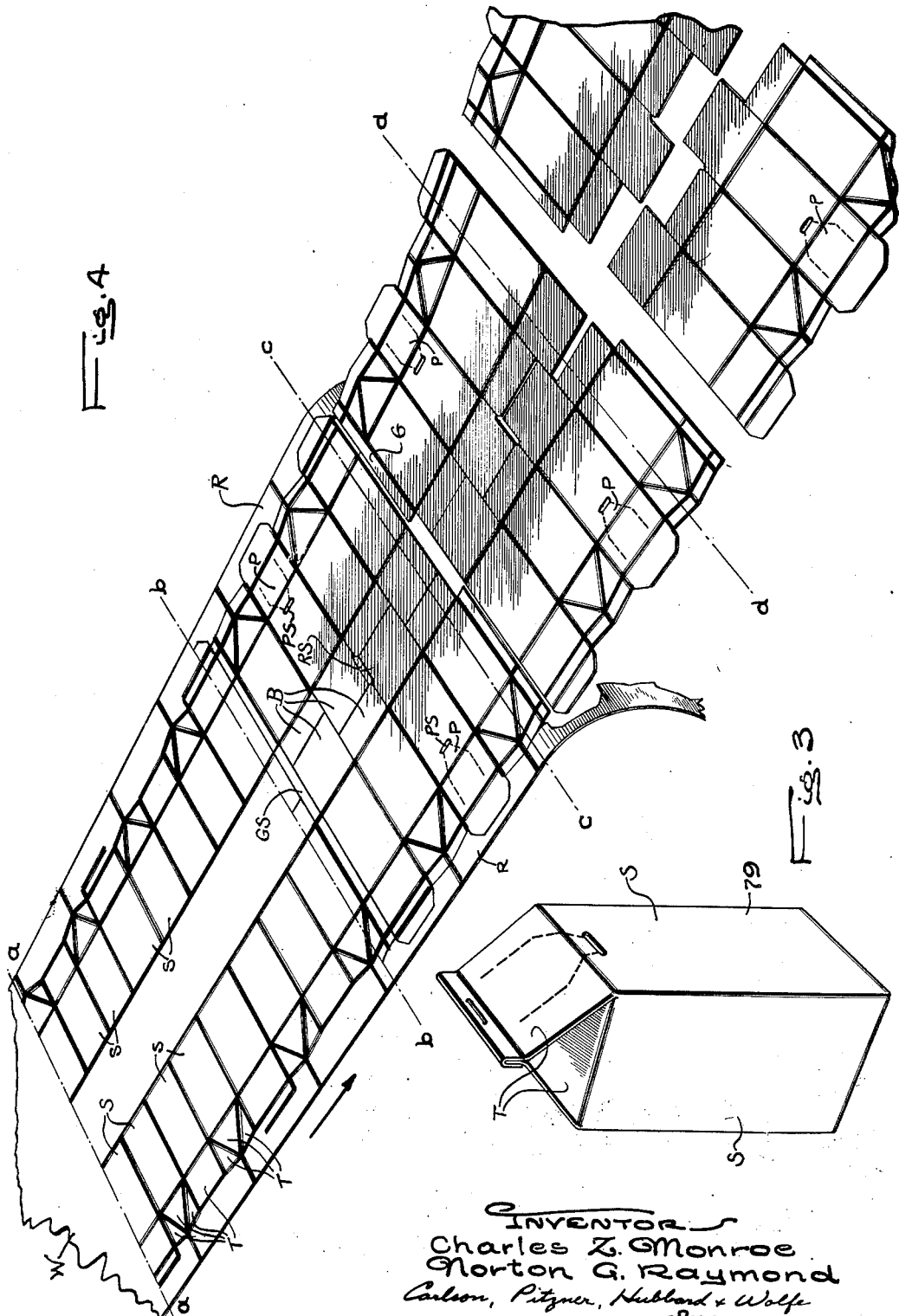
INVENTORS
Charles Z. Monroe
Norton G. Raymond
Carlson, Pitzner, Hubbard & Wolfe
ATTORNEYS

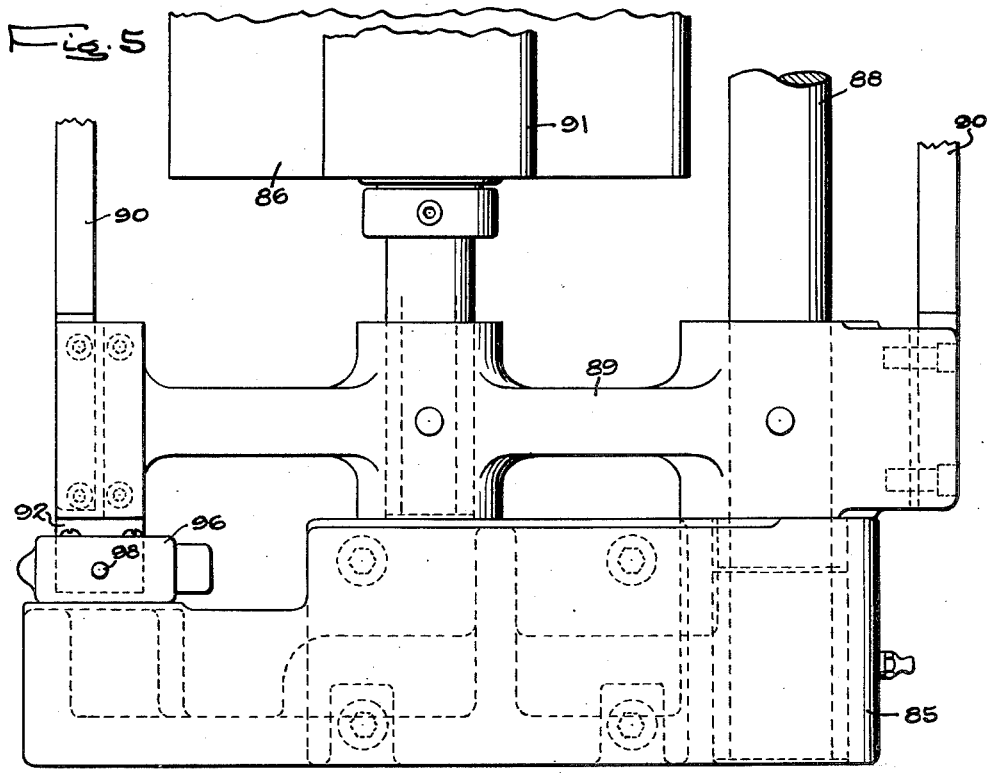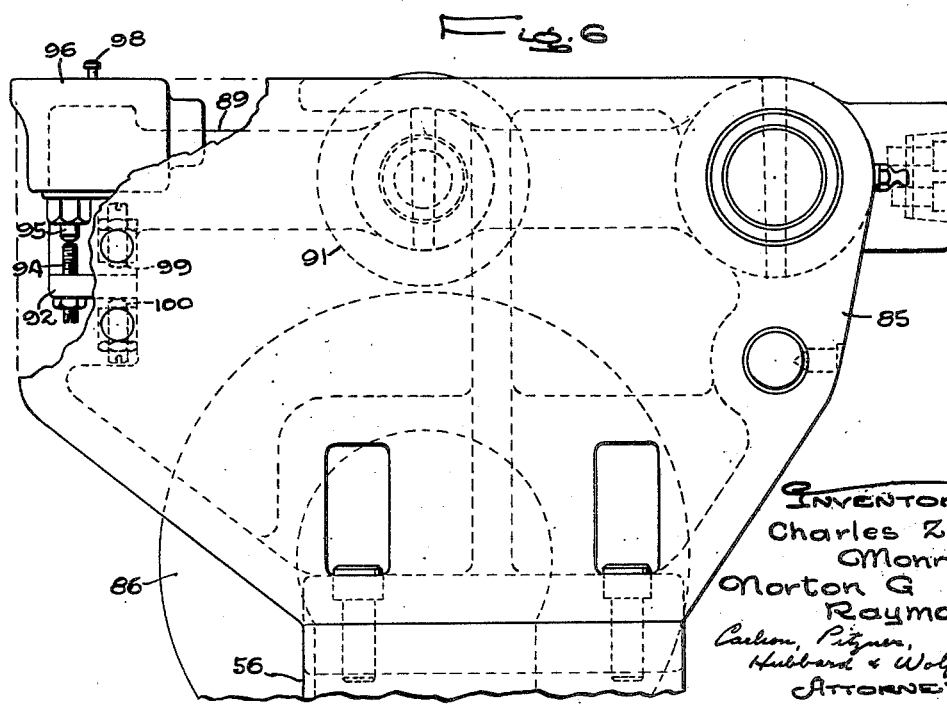

June 29, 1954     C. Z. MONROE ET AL     2,682,208
CARTON CONVERTING MACHINE
Filed April 15, 1948                                       18 Sheets-Sheet 4
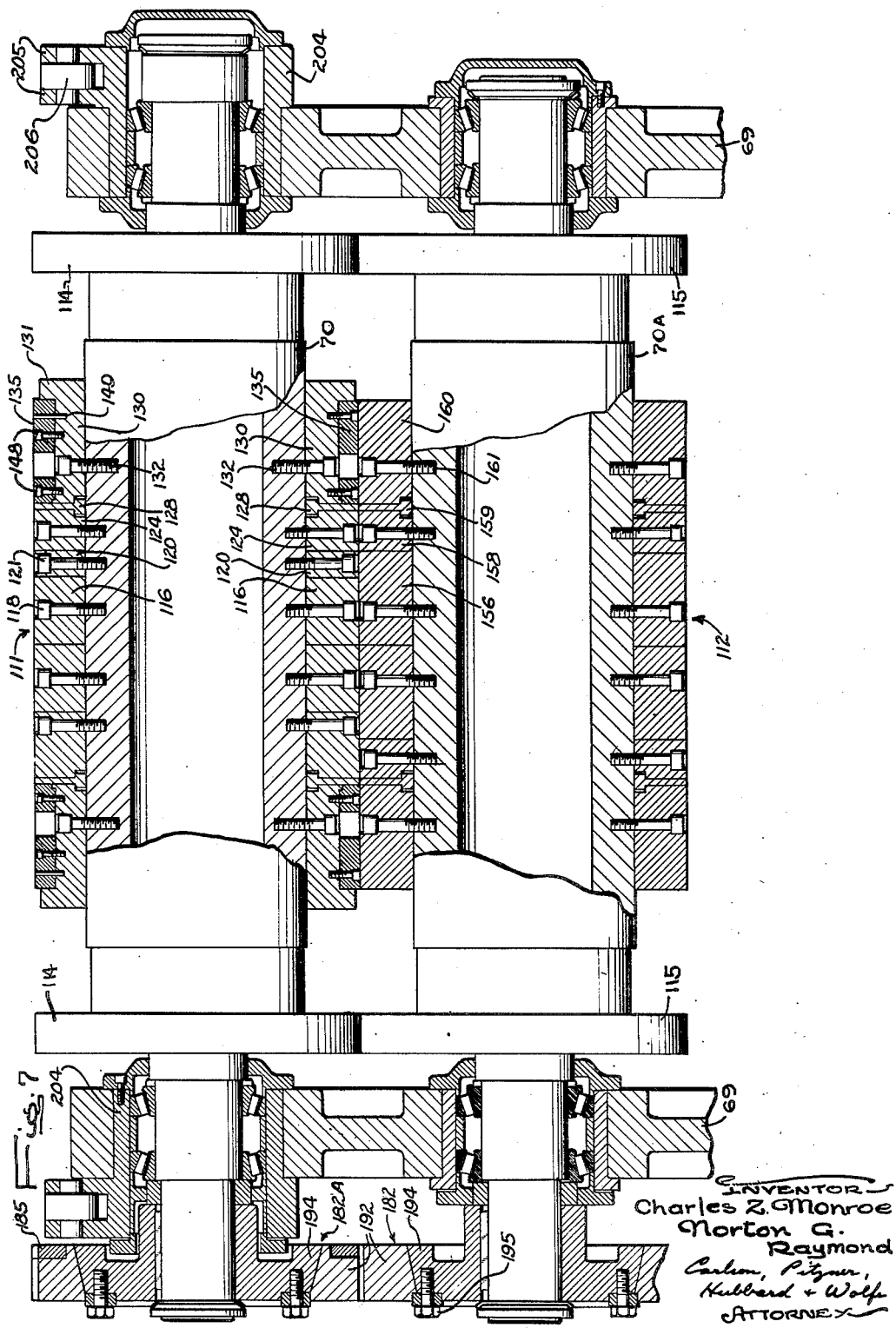

June 29, 1954  C. Z. MONROE ET AL  2,682,208
CARTON CONVERTING MACHINE
Filed April 15, 1948  18 Sheets-Sheet 5

UPPER SCORING BLOCKS

INVENTOR
Charles Z. Monroe
Norton G. Raymond
Carlson, Pitzner, Hubbard & Wolfe
ATTORNEYS

UPPER SCORING BLOCKS

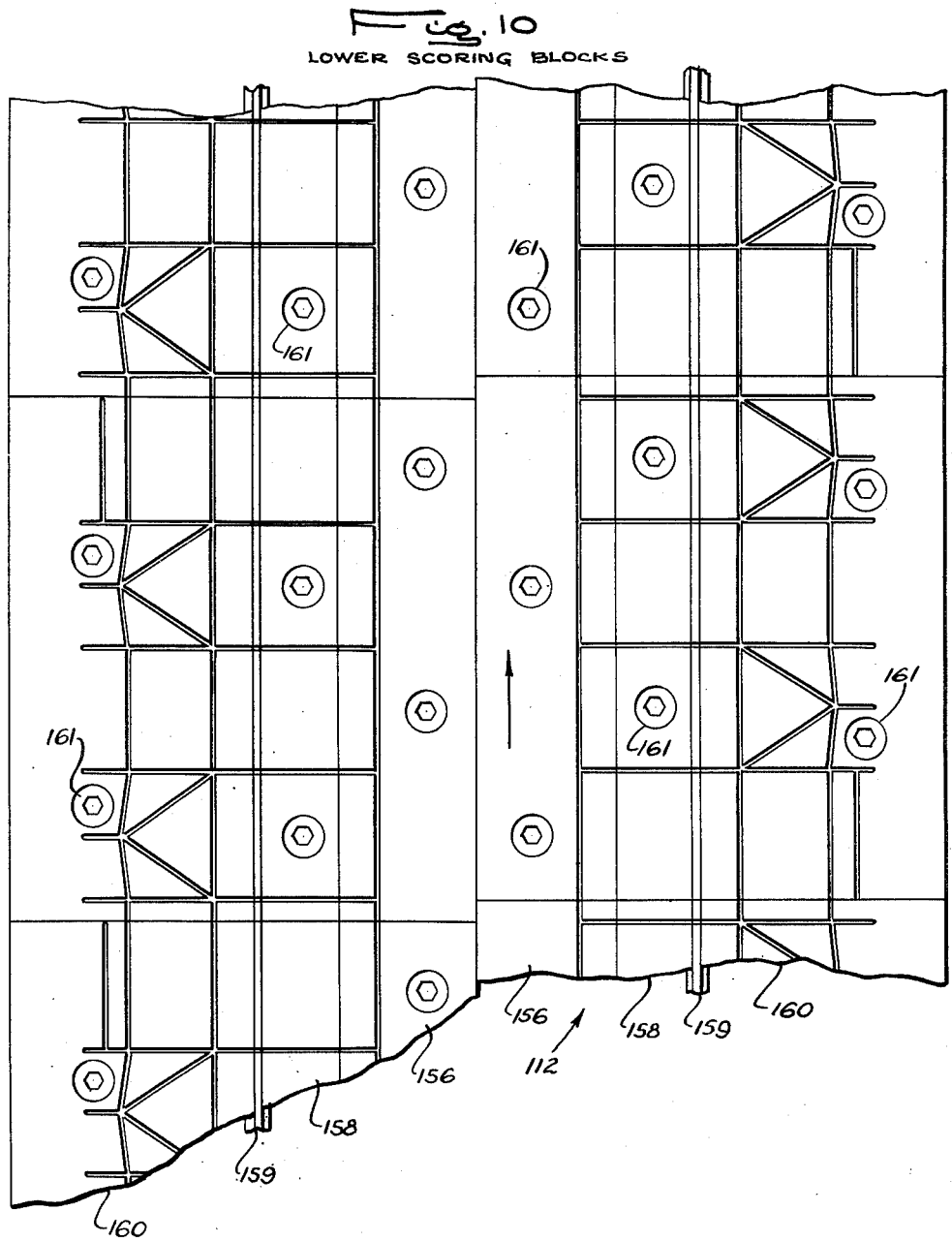

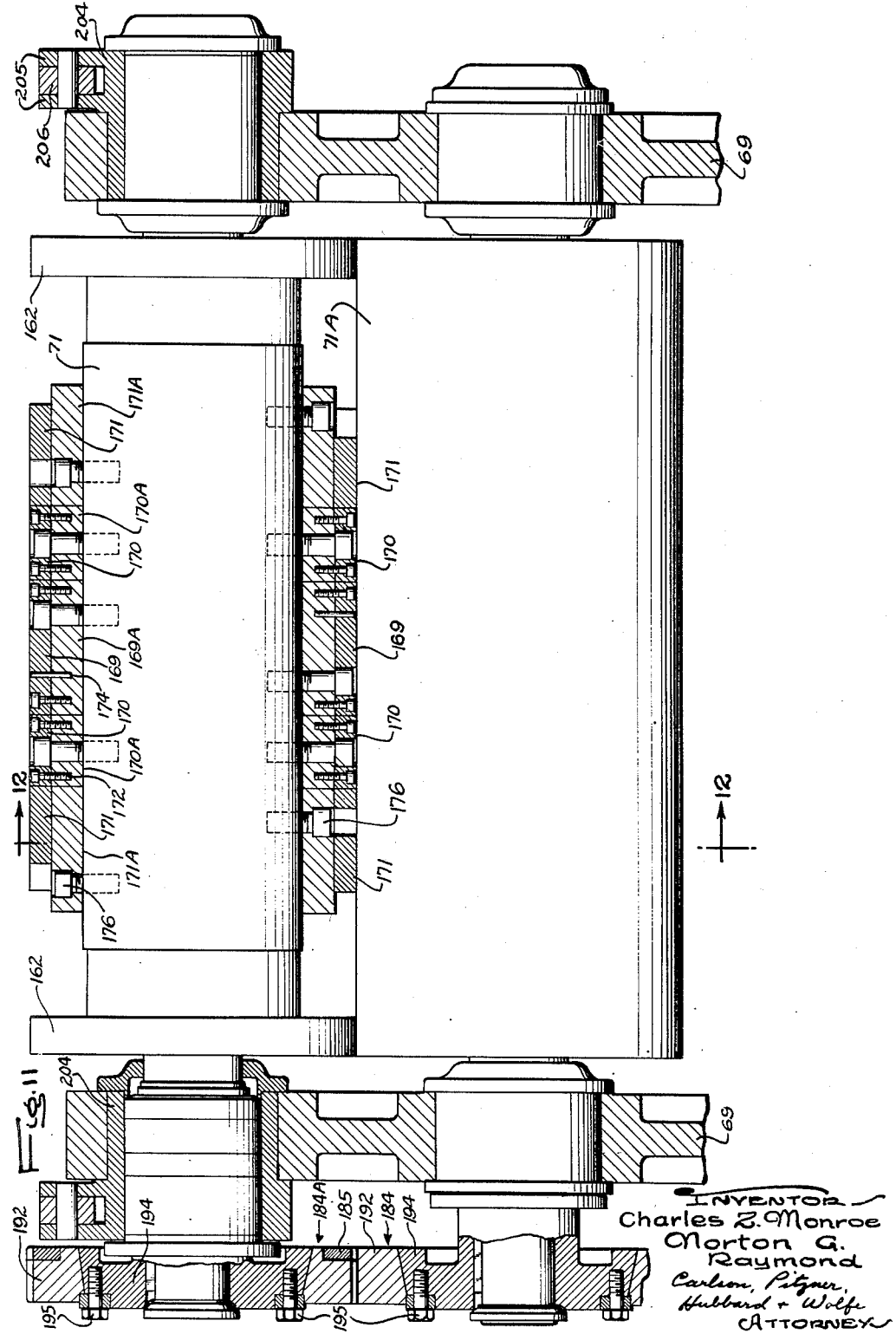

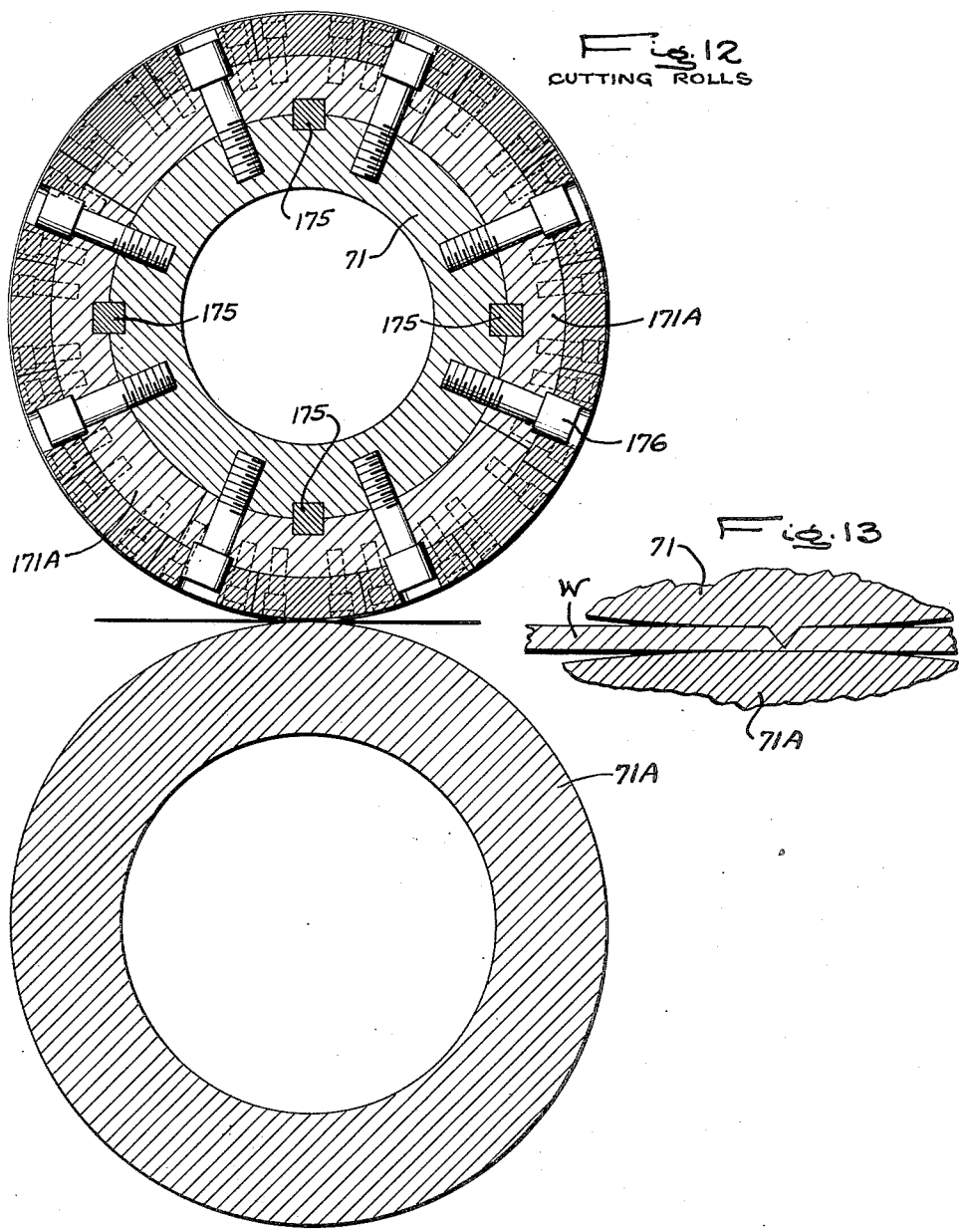

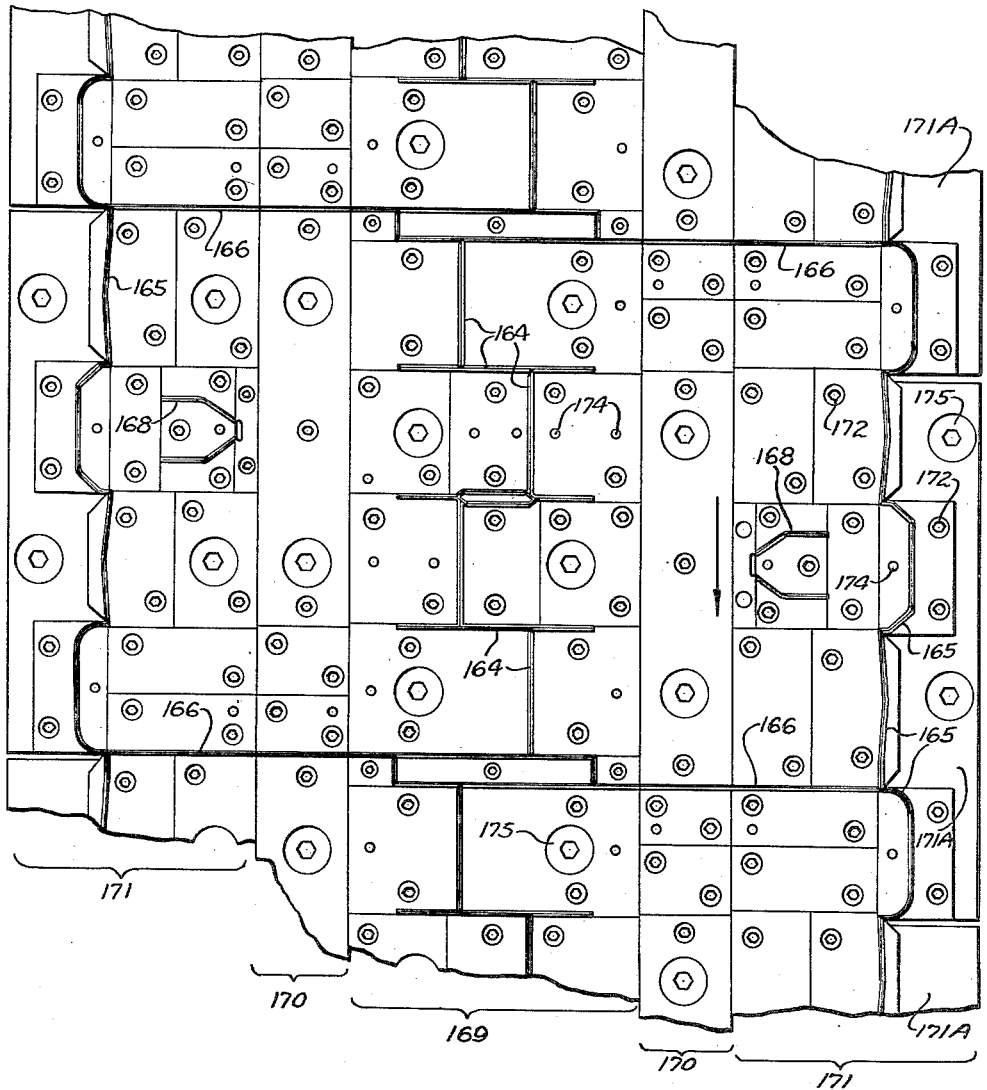

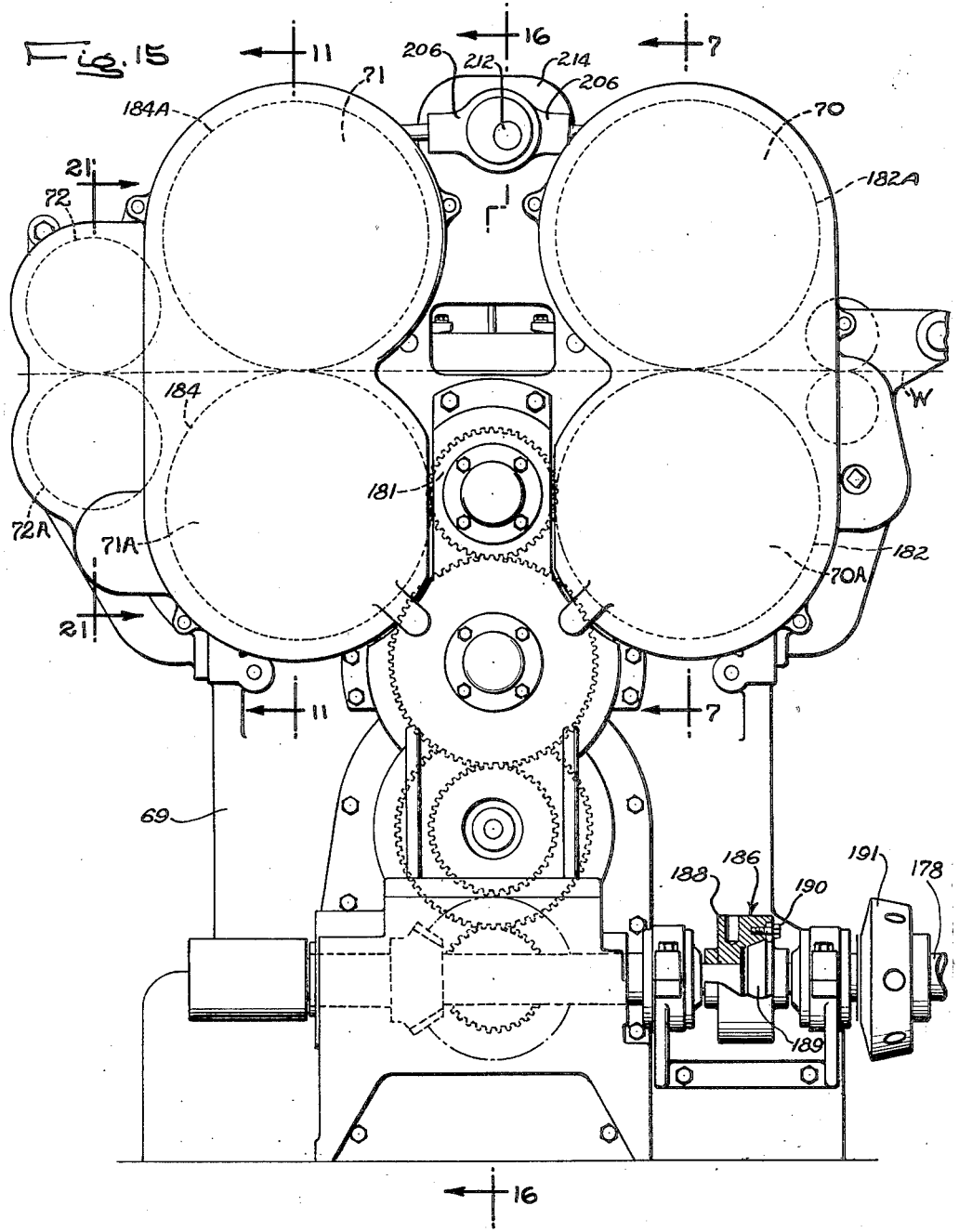

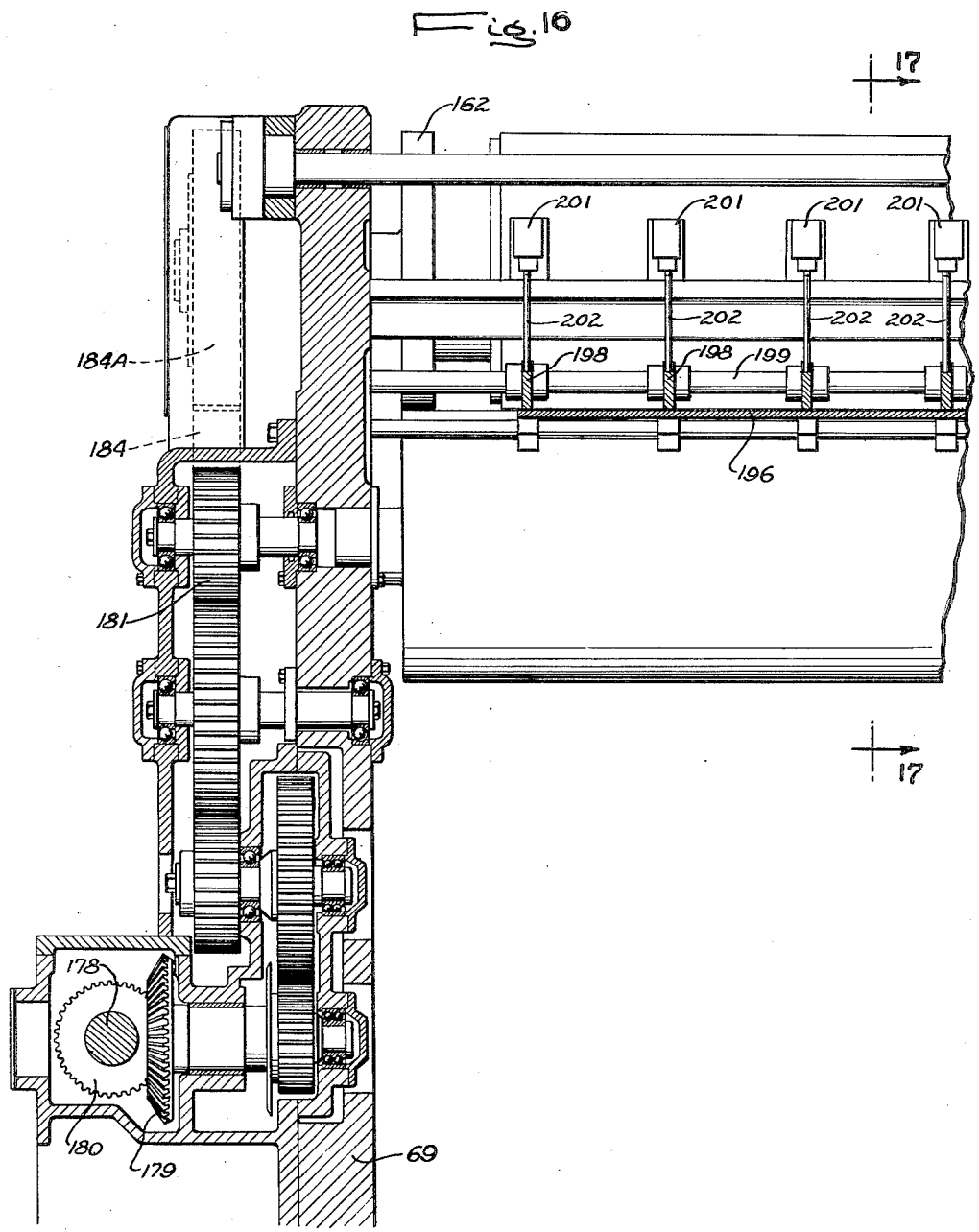

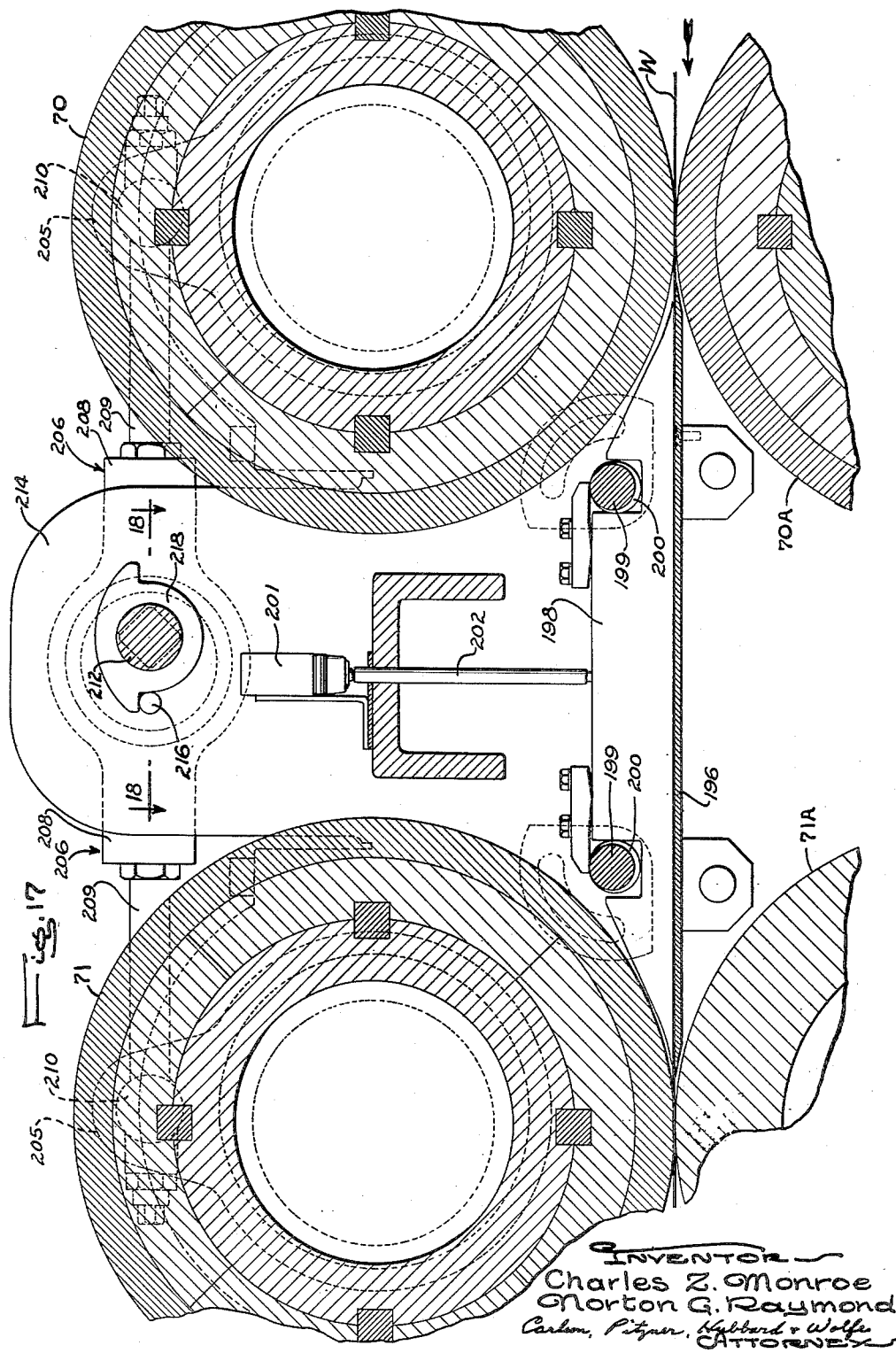

June 29, 1954  C. Z. MONROE ET AL  2,682,208
CARTON CONVERTING MACHINE
Filed April 15, 1948  18 Sheets-Sheet 14
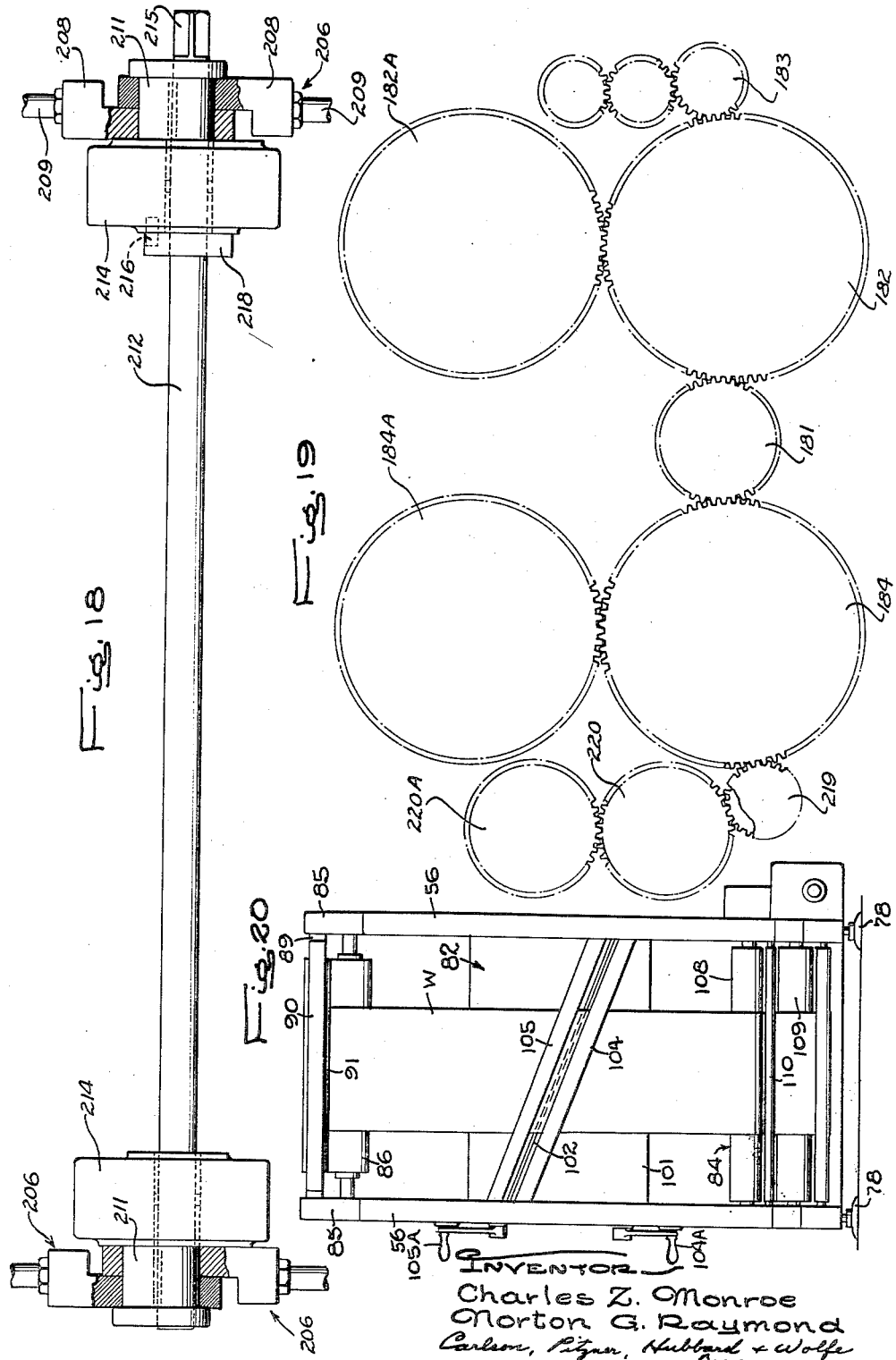

June 29, 1954 C. Z. MONROE ET AL 2,682,208
CARTON CONVERTING MACHINE
Filed April 15, 1948 18 Sheets-Sheet 15
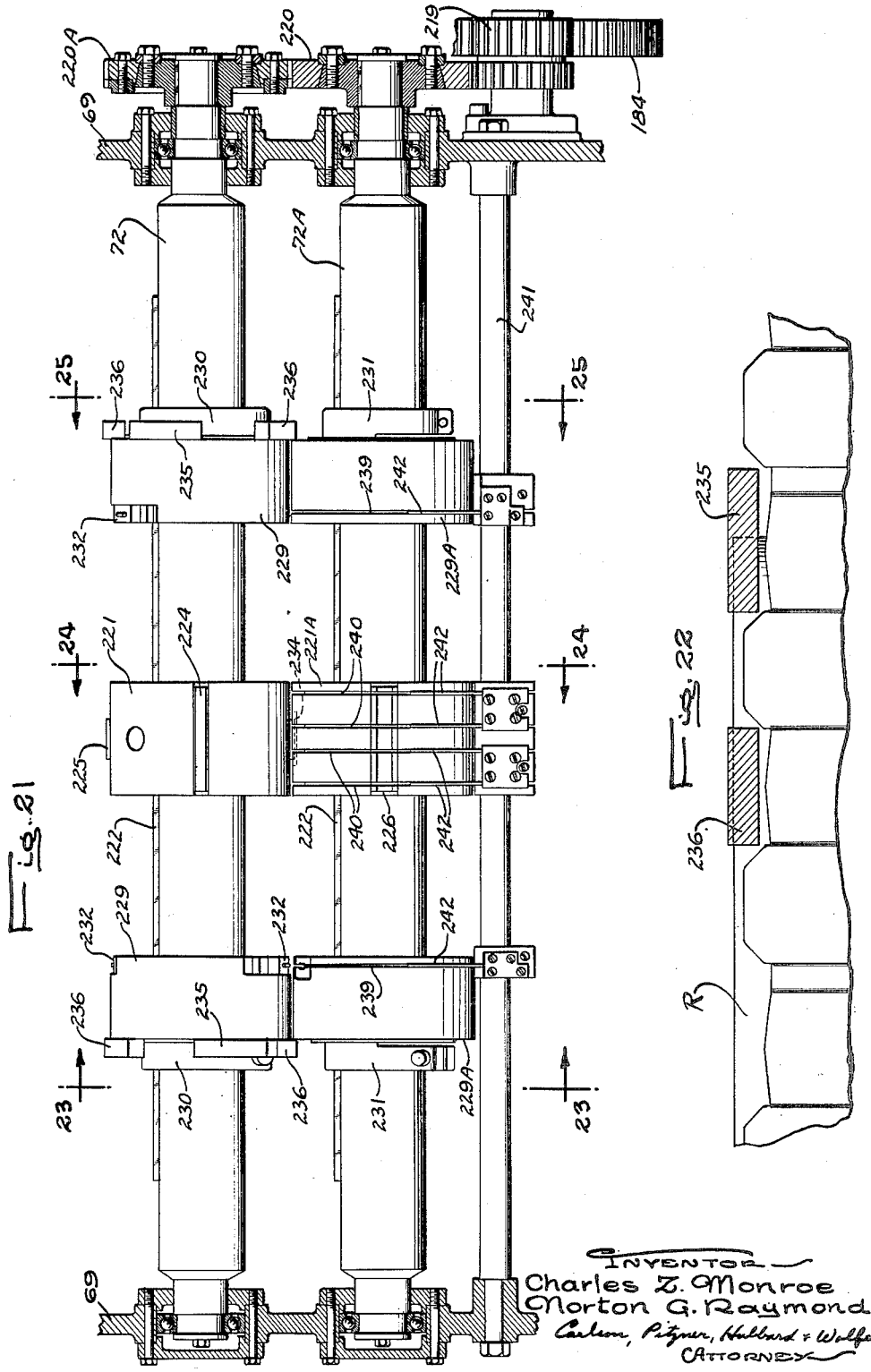

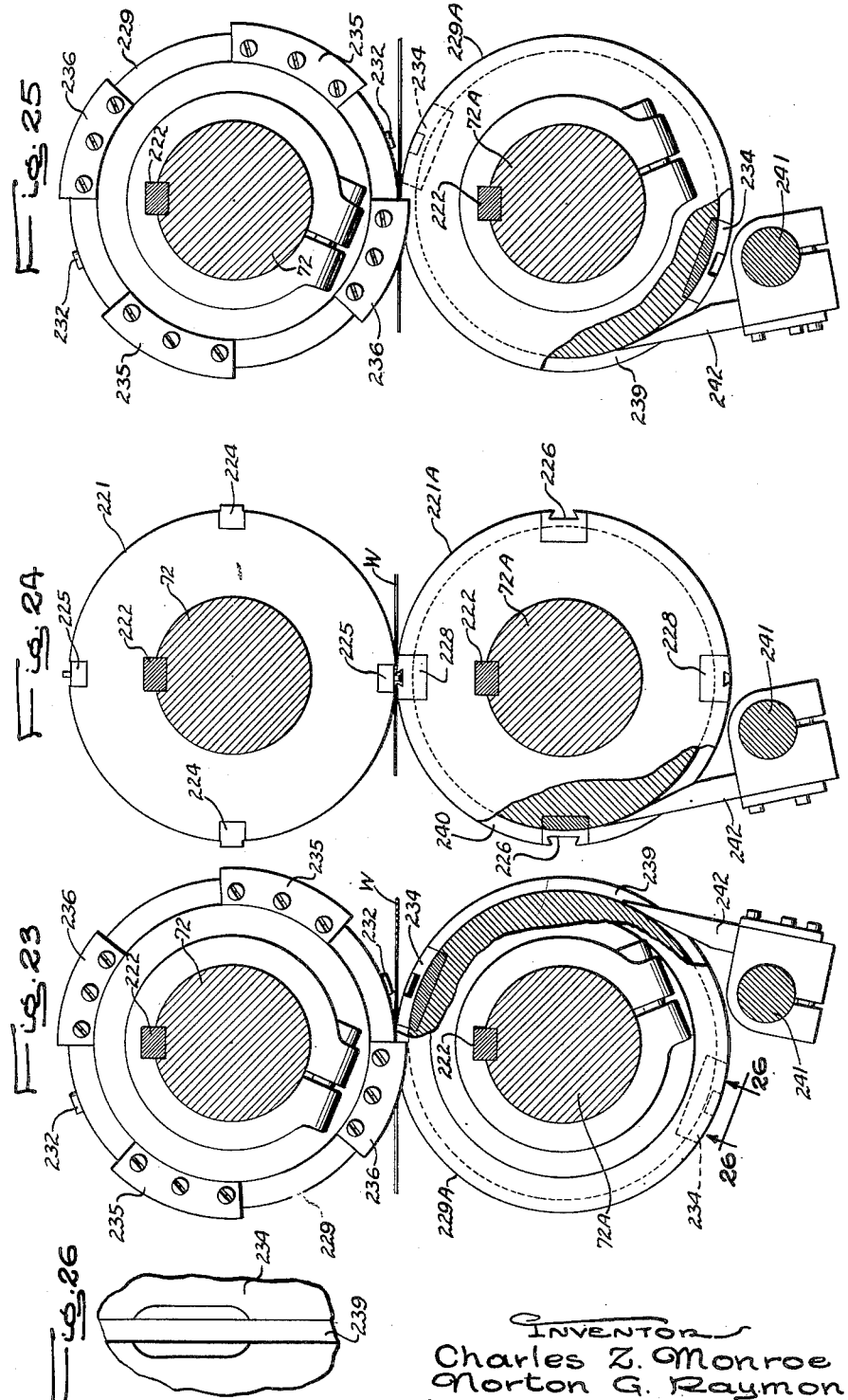

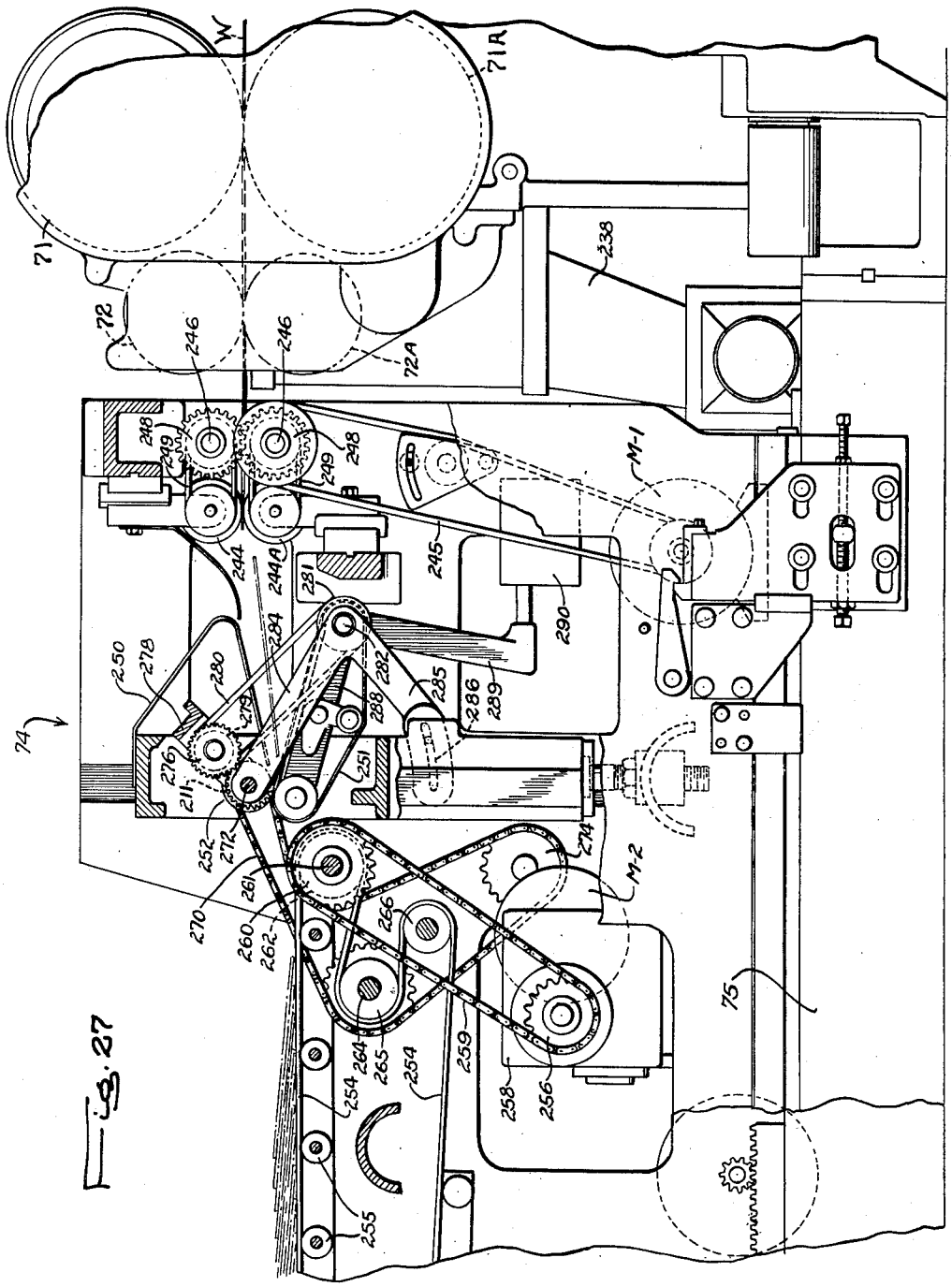

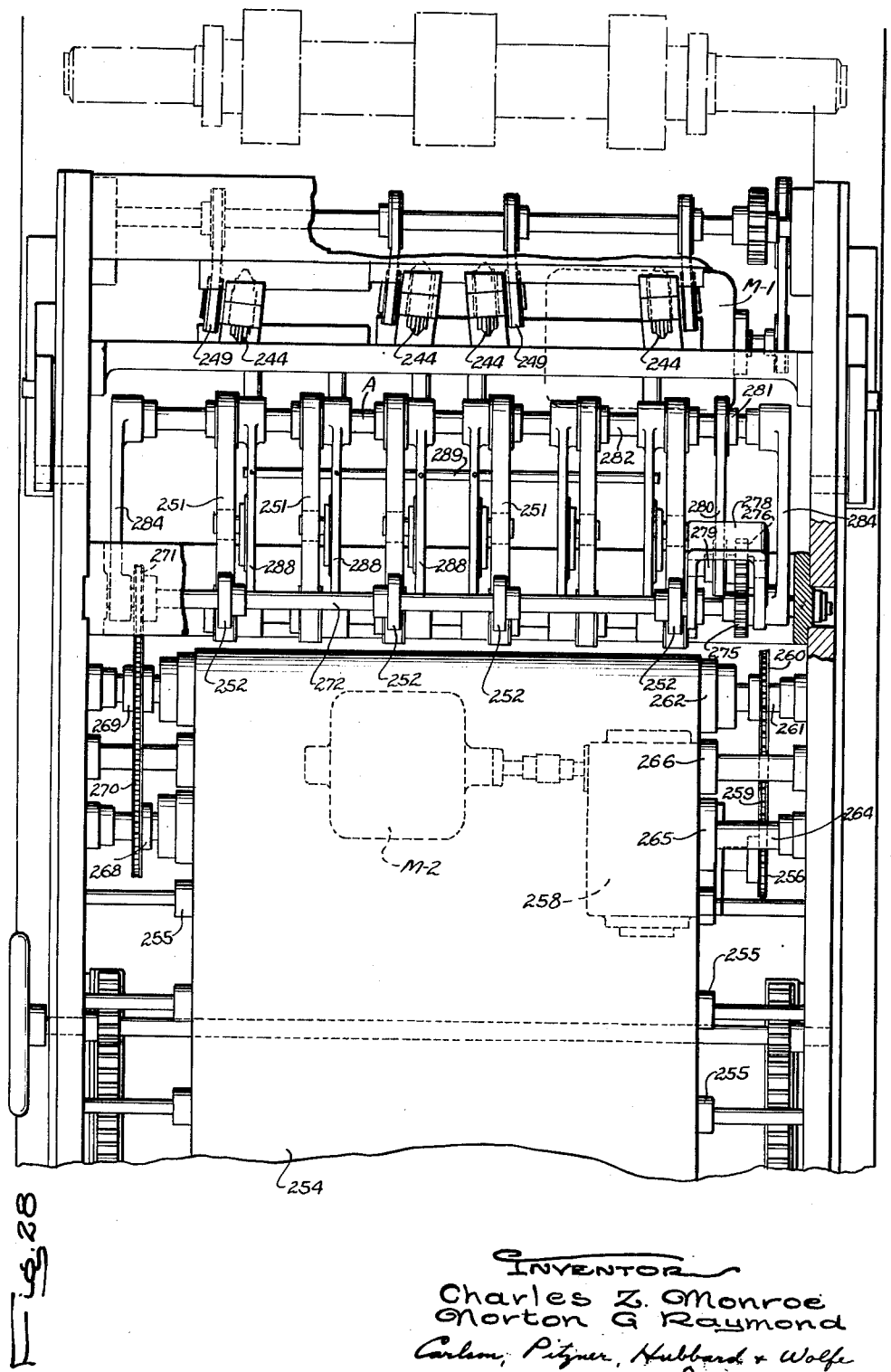

UNITED STATES PATENT OFFICE 2,682,208

CARTON CONVERTING MACHINE

Charles Z. Monroe and Norton G. Raymond, Detroit, Mich., assignors to Ex-Cell-O Corporation, Detroit, Mich., a corporation of Michigan Application April 15, 1948, Serial No. 21,296

20 Claims. (Cl. 93—36)

The present invention pertains generally to the manufacture of carton blanks, and more specifically to a machine for converting a continuous web of material such as paperboard into a series of completely severed and scored blanks.

One of the objects of the invention is to provide a carton converting machine adapted to receive paperboard stock in roll form and to unwind the same in a continuous moving web, to print advertising or identifying indicia on the stock, to score the same in order to facilitate folding during erection of the cartons, and finally to cut and separate the blanks from the web.

Another object is to provide a machine of the above type having rotary scoring and cutting means which can be shifted from the manufacture of blanks in one size to the manufacture of blanks in another size, such shifting taking place within an extremely short time and with a minimum of adjustment.

A further object is to provide a machine of the character set forth and having a novel arrangement for phasing various ones of the rotary members or couples therein with respect to each other and also with respect to other rotary members.

Still another object is to provide a machine of the above type having means for automatically dectecting stock manufacturer's splices already in the web and for conveniently resplicing the web to enable the same to be fed through the machine without injury to the latter. A related object is to provide a carton converting machine of the type set forth having adequate safeguards for the protection of the rotary die members thereof.

Another object is to provide a carton converting machine having novel means for separating scored and cut blanks from a continuously moving web.

Still another object is to provide a machine of the above type having novel and improved means for handling the severed blanks and delivering the same in overlapping relation and in laterally spaced parallel rows.

Further objects and advantages will become apparent as the following detailed description proceeds, taken in connection with the accompanying drawings wherein:

Fig. 1 is a side elevation depicting in its entirety an illustrative machine embodying the invention.

Fig. 2 is a plan view of the machine illustrated in Fig. 1.

Fig. 3 is a perspective view showing one type of carton made from blanks fabricated upon the machine illustrated in Fig. 1.

Fig. 4 is a perspective stop-motion view showing a major portion of a web of sheet material being processed by the machine of Fig. 1.

Fig. 5 is an enlarged fragmentary plan view of a splice detector mechanism.

Fig. 6 is a fragmentary end elevational view of the mechanism shown in Fig. 5.

Fig. 7 is a vertical sectional view through the axis of the scoring rolls, detailing such rolls and the die members carried thereby.

Fig. 10 is an enlarged fragmentary developed view of the surface of the lower scoring roll.

Fig. 11 is a vertical sectional view taken through the axis of the cutting rolls and detailing the arrangement of die blocks on the upper cutting roll.

Fig. 12 is an enlarged transverse sectional view taken through the cutting rolls and in the plane of the line 12—12 in Fig. 11.

Fig. 13 is an enlarged fragmentary sectional view through a portion of the web, one of the cutting dies, and the lower one of the cutting rolls.

Fig. 14 is an enlarged fragmentary developed view of the working surface of the upper cutting roll with the die blocks mounted thereon.

Fig. 15 is a side elevation of the scoring and cutting assembly, detailing the main driving connections thereto.

Fig. 16 is a vertical sectional view taken through the assembly of Fig. 15 and in the plane of the line 16—16.

Fig. 17 is an enlarged fragmentary side elevation of a detector shoe arrangement mounted between the scoring and cutting rolls, the adjustable separating means for such rolls also being indicated.

Fig. 18 is a horizontal sectional view through the separating means indicated in Fig. 17, taken in the plane of the line 18—18.

Fig. 19 is a diagrammatic view showing the relationship between the various gears in the scoring and cutting assembly.

Fig. 20 is an elevational view of the splice bed assembly.

Fig. 21 is an enlarged vertical sectional view taken transversely through the machine of Fig. 1 and detailing the scrap stripper rolls together with their associated stripper fingers.

Fig. 22 is an enlarged fragmentary plan view of the marginal edge portion of the web illustrating the manner in which the ribbon of scrap is separated therefrom by the stripper rolls.

Figures 8, 9:
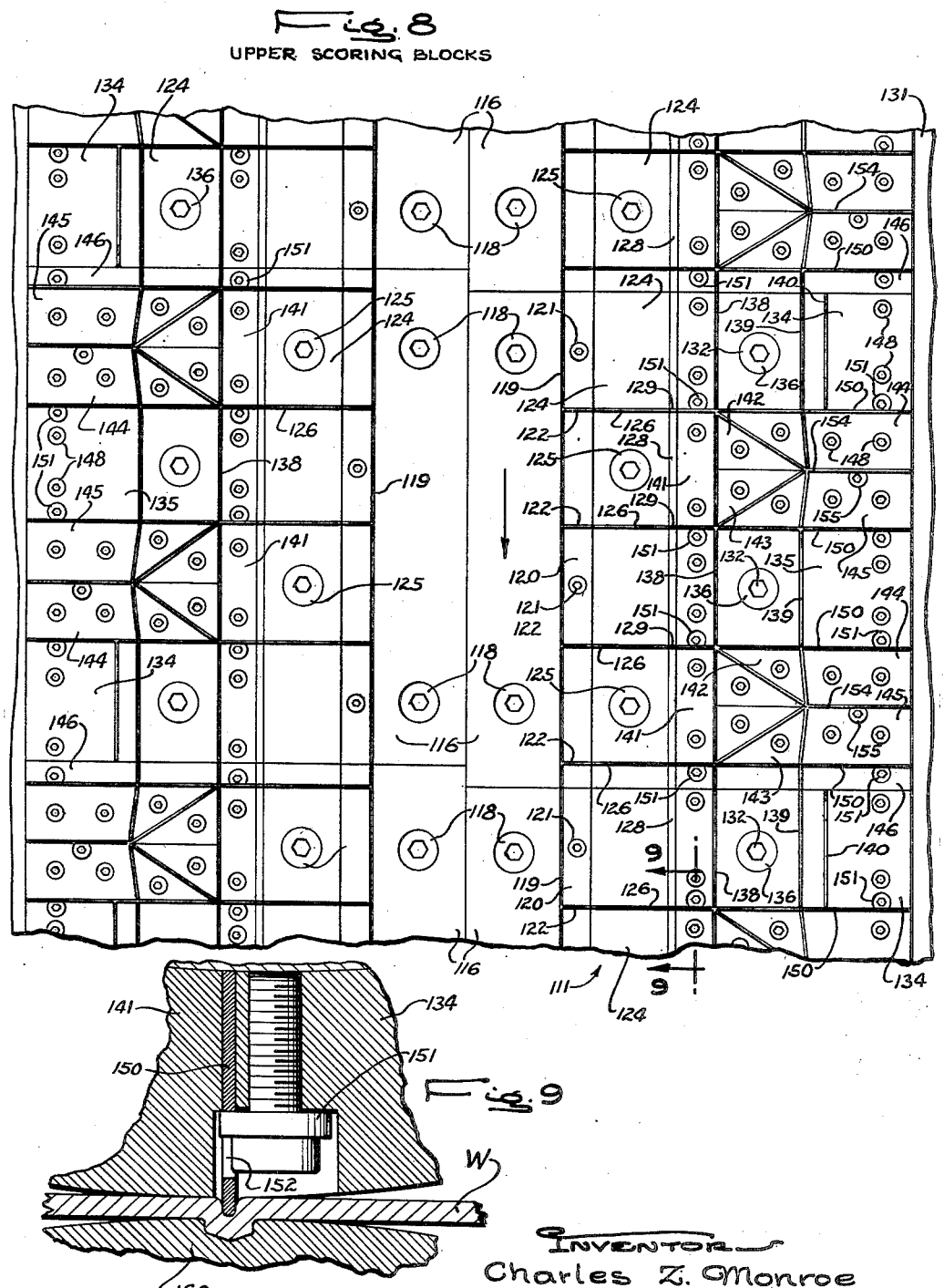
Fig. 8 is an enlarged developed view of the working surface of the upper scoring roll with the die members mounted thereon.
Fig. 9 is an enlarged fragmentary transverse sectional view through coacting die blocks carried by the scoring rolls, such view being taken in the plane of 9—9 in Fig. 8.

Figs. 23, 24 and 25 are enlarged transverse sectional views taken through the scrap stripper rolls and in the planes of the lines 23—23, 24—24, and 25—25, respectively, in Fig. 21.

Fig. 26 is an enlarged fragmentary view taken in the plane of the line 26—26 of Fig. 23.

Fig. 27 is an enlarged side elevational view detailing the blank separating and stacking mechanism.

Fig. 28 is a plan view of the mechanism illustrated in Fig. 27.

General

While the invention is susceptible of various modifications and alternative constructions, a preferred embodiment has been illustrated in the drawings and will be described below in considerable detail. It should be understood, however, that there is no intention to limit the invention to the specific form shown, but on the contrary, the intention is to cover all modifications and alternative constructions falling within the spirit and scope of the invention as expressed in the appended claims.

Referring more specifically to the drawings, the invention is there exemplified in an illustrative carton converting machine 50 (Figs. 1 and 2) powered by a main driving motor M and arranged to operate upon an elongate web W of paperboard or the like. Adjacent one end of the machine 50 is a relatively massive, bridge-like frame 51 whereon provision is made for rotatably supporting two separate rolls 52, 54 of paperboard stock, one roll being used to supply the machine and the other serving as a stand-by. In order to prevent delivery of stock to the machine 50 at a rate faster than the latter can handle, a condition which might arise upon a decrease in speed, a friction brake 55 is mounted on the frame 51 for cooperation with a drum unitary with each supporting shaft 52A, 54A of the respective supply rolls 52, 54. The brake 55 is manually adustable to produce various degrees of frictional drag on the drum and supporting shaft of the particular supply roll feeding the machine. At the innermost or right hand end of the frame 51 and supported between a pair of upstanding arms 56 unitary with the frame is a splice bed assembly 58 over which the web W is led before processing in the machine 50.

Longitudinally spaced from the right hand end of the frame 51 but rigidly connected thereto as by means of a pair of laterally spaced, parallel bed rails 59 is the main printing roller assembly 60 of a multi-color printing unit 61. An inking mechanism 62 is mounted on the rails 59 for bodily sliding movement relative to the roller assembly 60. A hand wheel 64 carried by the mechanism 62 serves as a convenient means for sliding the same, being drivingly connected to a pinion (not shown) which meshes with a rack on one of the bed rails 59. The unit 61, which is of somewhat conventional construction, is adapted to print advertising material or other indicia upon the web W. In order to dry the ink quickly prior to further processing of the web, the latter is passed under a drier 65 which in the present instance is heated by superheated steam.

Disposed in longitudinally spaced relationship with the printing unit 61 and rigidly connected to the main printing roll assembly 60 by means of a pair of laterally spaced bed rails 66 is a relatively massive roller arrangement which serves as a blank defining means 68. In the illustrative machine 50, such means comprises a pair of heavy, laterally spaced frame panels 69 which rotatably support three longitudinally spaced pairs of rolls or couples 70, 70A, 71, 71A and 72, 72A arranged to operate in succession upon the web W and in registration with the printing thereon. To insure registration under all operating conditions, these rolls are driven in timed relation with each other and also with the printing unit 61. The first pair of rolls or couples 70, 70A, is arranged to grip the web between them in a scoring or embossing operation which serves to define the necessary fold lines in each of the blanks. The second pair of rolls 71, 71A, grips the scored web and cuts almost all the way through the thickness thereof to define the perimeter of each carton blank. The web W is thereupon fed to the third pair of rolls or couples 72, 72A, which coact to strip the scrap portions from the former, leaving successive blanks still connected along their respective parting lines.

For the purpose of separating the connected blanks in the web W and delivering the same in an orderly manner, a separating and stacking means 74 is operatively disposed adjacent the left hand or output end of the blank defining means 68. The separating and stacking means 74 comprises a frame structure mounted on a pair of bed rails 75 for bodily sliding movement relative to the blank defining means 68, a handwheel 76 being provided for producing such movement.

The weight of the entire machine is borne upon a plurality of adjustable feet 78 disposed at strategic locations under the major frame elements and the various connecting bed rails 59, 66 and 75. The feet 78 also serve as a convenient expedient for leveling up the frame members upon erection of the machine.

In the present instance and merely by way of example, the machine 50 is set up to produce paperboard blanks for tubular containers 79 like the one illustrated in Fig. 3 and commonly referred to in the art as a gable-topped container. Such containers find wide utility in connection with the packaging of milk, cream and other dairy products.

Referring in particular to Fig. 4, there is shown in stop-motion a major portion of the web W as it is acted upon by the blank defining means 68 and the separating and stacking means 74. Thus the web, which is of sufficient width to make two carbon blanks side by side, enters the means 68 where it is pressed between the scoring rolls 70, 70A. The latter coact along the axis a—a, embossing the paperboard to define the fold lines for the carbon sides S, the side seam gluing flap G, and the fractional top closure panels T. Further along, the web is engaged upon the transverse axis b—b by the cutting rolls 71, 71A, which bite into the paperboard to define the external perimeter of each blank as well as the bottom closure flaps B and the flap P for the pouring opening. At the same time, the rolls 71, 71A also define a ribbon R of waste material at each edge of the web as well as gluing flap scraps GS, bottom flap relief scraps RS, and pouring opening scraps PS in the interior portion of the web. The stripper rolls 72, 72A act upon the web along the axis c—c and thus remove the waste ribbons R and the interior scraps GS, RS. Upon the passage of the web W from the blank defining means 68 and into the separating and stacking means 74, a separating couple 80, 80A grips the web along the axis d—d, tearing the blanks loose from the processed web and effecting a lateral separation of the blanks as indicated in Figs. 2 and 4.

Splice bed assembly

This assembly, designated generally above by the reference numeral 58, comprises a splice detector 81, a splice bed 82, and a decurler 84 (see Figs. 1, 2 and 20).

The splice detector 81 (Figs. 5 and 6) is primarily a device for measuring the thickness of the web W across its entire face at the earliest practicable point after it has been unreeled from either the roll 52 or the roll 54. In the manufacture of paperboard, it occasionally happens that a web which has been spliced at one or more points along its length is wound in a roll in such condition. The manufacturer, when making a splice of this nature, frequently leaves the ends of the web torn in irregular outline and overlapped for a considerable distance making the spliced portion double the normal web thickness. It is highly undesirable to run a web with a manufacturer's splice through a machine such as the one described herein. This is true not only because a certain number of defective blanks would be produced, but also because of the strong possibility that damage might result to the machine through tearing and tangling of the web in the rollers. While it is the custom of paper manufacturers to mark spliced rolls, this practice is sometimes omitted, and it therefore becomes necessary to detect such splices automatically. Accordingly, a pair of fixed brackets 85 are rigidly attached to respective ones of the upstanding frame arms 56. Journaled between the brackets 85 and spanning the arms 56 is a relatively large idler roller 86 over which the web W is led shortly after it leaves the supply rolls 53, 54. Also spanning the brackets 85 and journaled therein is a rockshaft 88 to which is rigidly secured a pair of laterally spaced arms 89. The latter are joined at their extremities by a pair of stiffener bars 90 which merely provide additional rigidity. The arms 89 are, in turn, spanned by a supporting shaft on which is journaled a detector idler 91 of relatively small radius compared with the roller 86. The idler 91 is, of course, adapted to follow the contour of the upper surface of the web W. In the event that a splice should pass between the rollers 86 and 91, the increased web thickness due to such splice would tend to separate these rollers and thereby rock the arms 89 clockwise about their pivot points.

Provision is made for utilizing the rocking movement of the arms 89 due to the detection of a splice to actuate an appropriate signal or control in order that the machine might be promptly stopped as by dynamic braking. This is accomplished in the present instance by mounting a laterally projecting finger 92 on one of the arms 89. The finger 92 carries an upstanding pin 94 which is arranged to actuate the plunger 95 of a Micro Switch 96 rigidly mounted upon an adjacent one of the fixed brackets 85. The switch 96 can readily be arranged to actuate a suitable signal or alternatively can be connected into an appropriate motor control circuit. Preferably, this switch is not of the automatic resetting type, but is equipped with a manual reset plunger 98 for such purpose. In order to establish terminal points for the rocking movement of the arms 89, a pair of adjustable mechanical stops 99, 100 are mounted on the bracket 85 for coaction with the outermost end of the projecting finger 92 on the arm 89.

The splice bed 82 (Fig. 20) is formed with a vertically disposed plane face 101 which is traversed by a narrow groove 102 running at an angle in the neighborhood of 30 degrees to the horizontal. Stated another way, the groove 102 makes an angle of about 60 degrees with the direction of web travel. The groove 102 is flanked on either side by clamps 104, 105 normally spaced apart from the face 101 but movable into abutment therewith by means of their respective operating handles 104A, 105A.

Upon detection of a splice in the web by the device 81 the machine 50 will be quickly brought to a stop. After opening the original splice the lower clamp 104 can then be tightened on the trailing end portion of that section of the web (the "old" web) which is threaded through the machine. A knife blade can then be drawn across the groove 102 so as to sever the trailing end of the "old" web above the groove. The upper clamp 105 can thereupon be tightened upon the leading end portion of the web section still attached to the supply roll (the "new" web) after such section has been lapped over the groove 102. Upon the severing of the leading end of the "new" web below the groove as by drawing a knife across the latter, the adjacent web ends will have been cut on the same diagonal. Consequently, the trailing end of the "old" web and the leading end of the "new" web can be brought into abutment and joined by means of a piece of adhesive tape to form a splice which can be safely fed through the machine 50, thereby eliminating the need for rethreading the machine.

In order to permit ready access to the splice bed 82 on the part of an operator, a walkway 106 is provided transversely of the machine 50. Thus an operator standing on the walkway 106 can conveniently reach any and all parts of the bed 82 regardless of the width of web which it might be adapted to handle.

The decurler 84 (Figs. 1 and 2) comprises a pair of vertically spaced draw rolls 108, 109, located immediately below the splice bed and operatively associated with a small diameter decurler roll 110 interposed between the rolls 108 and 109 but offset therefrom. The object of this device is of course to neutralize the set or curvature acquired by the paper board stock when wound into a supply roll. Accordingly, the web is led from the splice detector down across the splice bed and thence to the upper draw roll 108. From here, the web is bent sharply around the decurler roll 110 upon an arc having an opposite curvature to that of either supply roll. Upon leaving the roll 110, the web passes around the second draw roll 109 and then around a suitable guide roll, finally running under the walkway 106 and thence to the printing unit 61. The decurler roll 110 is journaled in floating bearings having adjustable biasing springs which oppose the tension in the bight of web passing around the roll 110.

Scoring and cutting arrangement

Upon reference to Fig. 7, it will be perceived that each of the scoring rolls 70, 70A is fashioned as a stepped cylindrical member having a unitary supporting shaft journaled in appropriate bearings carried by the side frame panels 69. These rolls are preferably made with relatively large diameters and are of sufficient width to define scoring patterns for two blanks at a time, side by side in th web W. In the present instance, the rolls 70, 70A are adapted to score a total of eight blanks in one revolution, thereby contributing substantially to the exceptionally high output of the machine 50.

Rigidly mounted on the rolls 70, 70A are groups of die blocks 111, 112 (Figs. 7, 8, 8A and 12) and, as the rolls rotate in timed relation with each other, the die blocks in the groups 111, 112 coact upon the web W passing therebetween. The side panels and fractional end panels of each blank are thus clearly defined by a suitable pattern of score lines and since such action takes place in registration with any printed matter previously applied to the web, the printing will be properly centered on the panels of the blank.

To insure proper spacing between the die groups 111, 112 of the scoring rolls, the latter are provided with respective pairs of axially spaced bearer flanges 114, 115 straddling the web W. These flanges, which in the present instance are unitary with their corresponding rolls, are carefully machined to size. When the rolls are installed, there will be rolling contact between the flanges 114 of the roll 70 and the flanges 115 of the roll 70A. Consequently, the axes of the scoring rolls will be maintained in strict parallelism and the die groups 111, 112 will have proper spacing regardless of any play which might eventually develop in the roll supporting bearings.

Figure 8A:
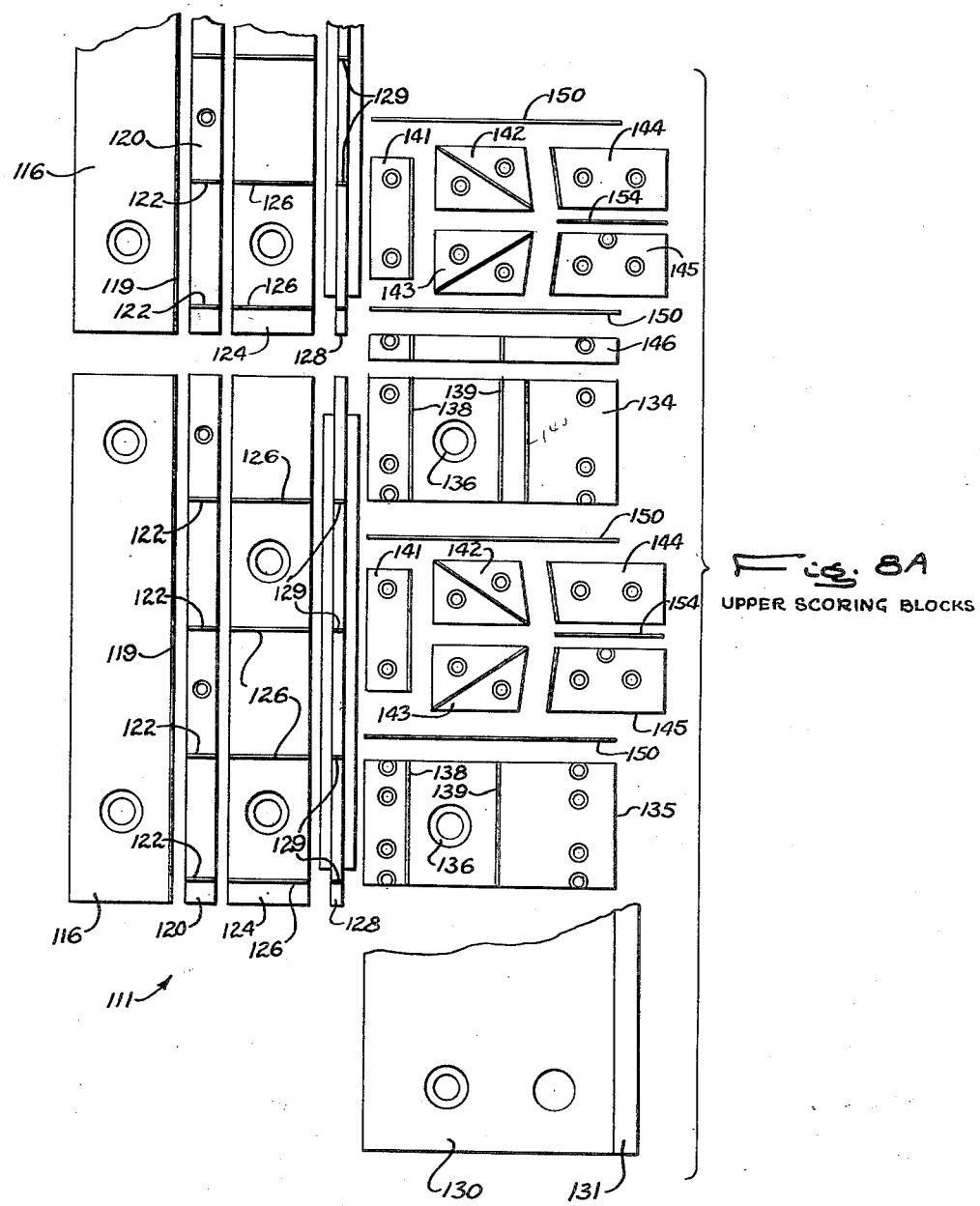
Fig. 8A is an exploded view detailing the arrangement of the various die blocks carried by the upper scoring roll.

The construction and arrangement of the various scoring blocks has been simplified to render the same more economical of manufacture and to increase their reliability. Considering first the die group 111 on the upper scoring roll 70, it will be noted that this group comprises two identical subassemblies disposed one on either side of the transverse center line of the roll 70. In view of their identity, a description of one of these subassemblies will suffice for both. Accordingly, it will be observed that the roll 70 is girded adjacent its transverse center line by a series of relatively heavy segmental scoring blocks 116 (Figs. 7, 8, and 8A). The latter are arranged end to end in an annular pattern and are securely fixed to the roll as by means of heavy cap screws 118. The heads of these screws are of course housed within suitable counterbores to prevent them from contacting the web W and damaging the same. Each of the blocks 116 is formed with a longitudinal rib 119 which serves to define the common score line separating the side panels S from the bottom flaps B of a finished carton blank.

Also girding the roll 70 and disposed in abutting relationship with the blocks 116 is a second series of segmental scoring blocks 120 of comparable arcuate length to the blocks 116. The blocks 120 are rigidly attached to the roll 70 as by means of cap screws 121 mounted in counterbores after the manner of the screws 118. Each of the blocks 120 is formed with a series of scoring ribs 122 running perpendicular to the rib 119 and spaced circumferentially to correspond with the desired locations of the score lines between the side panels of the carton blank. To facilitate economical manufacture, it is preferable that the blocks 116, 120 be separate pieces but, if desired, there may be substituted a series of single blocks having an external contour corresponding to the combined contours of the blocks 116, 120.

Abutting one of the common side edges of the blocks 120 and mounted outwardly thereof on the roll 70 is another series of segmental scoring blocks 124 generally similar in external contour to the blocks 120 but of somewhat greater width. The blocks 124 are secured to the roll by means of cap screws 125 and are formed with transverse scoring ribs 126 spaced in alinement with the ribs 122 and constituting in effect a continuation thereof. To obtain proper spacing of the blocks in the group 111, it might be desirable to use an additional series of arcuate blocks 128 immediately adjacent the blocks 124. The blocks 128 which are of extremely narrow width, have transverse ribs 129 on their outer surfaces, such ribs being alined with the ribs 126 and constituting continuations thereof. Because of their narrow width, the blocks 128 are not screw mounted but instead each is formed with an inverted T-shaped cross section throughout the major portion of its length and is retained in place due to the interlocking action of adjacent die blocks.

Due to the complex pattern of score lines which must be applied to the web to define the fractional top closure panels T of the carton blank, a somewhat different die block construction from that described above has been utilized here. Thus the blocks for the top closure panels of any particular carton blank are arranged in a rigid, multi-sectional assembly upon an arcuate supporting plate 130 having an upstanding locating shoulder 131 along one edge thereof (Figs. 7 and 8). Applying an apt expression from the printing art, the supporting plate 130 will be hereinafter referred to as a "turtle." In the complete die group 111, the turtles 130 are mounted end-to-end in a continuous ring around the roll 70 and in abutting relationship with the blocks 128. Preferably, the turtles 130 are keyed on the roll 70 and secured in place by means of cap screws 132.

Turning again to Figs. 8 and 8A, it will be seen that the die block assembly carried by a single turtle 130 comprises a pair of blocks 134, 135 corresponding to the larger top closure panels of the blank. These blocks are formed with counterbores 136 for the turtle securing screws 132 and have unitary scoring ribs 138, 139, running circumferentially thereof. In addition, the block 134 is formed with a third scoring rib 140 spaced from but substantially parallel with the other ribs 138, 139. Spaced alternately with the blocks 134, 135 are two substantially identical groups of smaller blocks 141, 142, 143, 144 and 145. In the present instance, each of these blocks has only a single scoring rib thereon, making for simple and economical construction. Near one of the radial end faces of the turtle 130 and adjacent the blocks 141, 143 and 145 of one group is a relatively narrow block 146 corresponding to the location of the gluing strip of the completed carton blank. The die blocks are firmly held in place on the turtle by means of a series of cap screws 148 which engage tapped holes in the former and also by means of one or more dowels 149.

To minimize the number of scoring ribs which must be machined on the outer surfaces of the die blocks carried by the turtles 130, a plurality of scoring rules are interposed between certain ones of these blocks and extend in a direction substantially parallel to the axis of their common arc of curvature. Thus running from the shoulder 131 to the inner edge of the turtle and disposed in alinement with the scoring ribs 122, 126 and 129 on the inside blocks are a series of scoring rules 150. Each of the latter is held securely in place as by means of screws 151 which coact with suitable slots 152 in the rule (Fig. 9). Interposed between respective ones of the blocks 144, 145 and running from the shoulder 131 to the angular scoring ribs adjacent the innermost edges of such blocks is another series of scoring rules 154 substantially shorter than the rules 150. The latter are held in place as by screws 155 after the manner of the rules 150.

Considering next the die group 112 carried by the lower scoring roll 70A (Figs. 7 and 10), an arrangement somewhat simpler than that of the group 111 is employed. As indicated in the drawings, the group 112 comprises in this instance arcuate blocks 156, 158, 159, and 160 of four different widths and arranged respectively in rings mounted side-by-side on the roll 70A, being secured as by cap screws 161. The common circumferential surface of the blocks 156, 158, 159 and 160 is suitably grooved in a pattern identical to that defined by the ribs and rules of the dies on the upper scoring roll. As the rolls 70, 70A rotate, these patterns mesh and thereby impress the score lines into the web W as illustrated in Fig. 9.

The scoring die arrangement just described is susceptible of being rapidly shifted from the manufacture of blanks of one size to the manufacture of blanks of another size, such shifting taking place with a minimum of readjustment. Referring once more to Fig. 7, it will be noted that the blocks 124 and 158 are of substantially identical width and occupy a common rotational plane. Since these blocks help to define the side panels of the carton blanks, the width of the blocks 124, 158 will be proportionate to the size of the blanks. Thus, by the mere substitution of cheaply made spacer blocks of various sizes for the blocks 124, 158, the scoring dies can be quickly conditioned for the manufacture of various corresponding sizes of carton blanks. When the spacer blocks for the side panels are changed, it is unnecessary to disturb the multi-sectional die assembly carried by the turtles 139 for the top flaps of the blanks. Instead, one has only to remove the mounting screws 132 and 161 which respectively secure the turtles and the cooperating lower roll die blocks 160 and to shift these parts axially of the rolls to accommodate the new side panel spacer blocks, subsequently engaging the screws in another set of tapped hopes in the rolls 70, 70A. During any such adjustment, the centrally located die blocks 116, 128 and 156 remain undisturbed upon the rolls 70, 70A.

The cutting rolls 71, 71A (Figs. 11 to 14, inclusive) are of substantially the same diameter as the scoring rolls 70, 70A and are likewise adapted to process a total of eight carton blanks in one revolution. The cutting rolls are each formed with unitary supporting shafts journaled in bearings carried by the side frame panels 69. The upper cutting roll 71 is closely similar to the upper scoring roll 70, carrying an assembly of cutting dies adapted to bite into the web passing between the rolls 71, 71A. The lower cutting roll 71A, on the other hand, presents an unbroken cylindrical surface to the roll 71 and thereby serves to back up the web as the same is cut by the dies. The rolls 71, 71A are so spaced that the cutting edges of the dies carried by the upper roll will bite almost but not quite through the web W, thus weakening the latter along lines of eventual severance which will define the outline of the carton blanks being produced in the machine. This feature contributes materially to the longevity of both the lower roll 71A and the cutting dies because direct metal-to-metal contact between such parts is nicely avoided. Proper spacing between the rolls 71, 71A is maintained due to rolling contact between a pair of bearer flanges 162, unitary with the roll 71, and the circumference of the roll 71A.

As clearly indicated in Fig. 14, the cutting dies mounted on the roll 71 comprise a multi-sectional assembly of blocks, most of which are formed with cutting ribs of wedge-like cross section. Thus the blocks in the central portion of the roll are provided with cutting ribs 164 for defining the bottom closure flaps of the carton blanks. On the other hand, the blocks adjacent either edge of the roll 71 have ribs 165 for defining the extremities of the top closure flaps of the blanks. At circumferentially spaced intervals, the blocks are formed with cutting ribs 166 running axially of the roll 71 and connecting the ribs 164, 165 to define transverse severance lines in the web for successive blanks. Also located on suitably spaced blocks are cutting ribs 168 running in a U-shape to define the pouring openings of the blanks.

To avoid weakening the roll 71 with a large number of screw holes and also to facilitate handling of the blocks, the latter are grouped together as at 169, 170, and 171 and such groups are respectively mounted on a series of arcuate supporting plates or turtles 169A, 170A, and 171A. The blocks are secured to the turtles as by cap screws 172 (not detailed) and dowels 174, while the turtles are keyed to the roll 71 as at 175 and retained thereon by cap screws 176.

The foregoing construction makes it possible to alter the size of the carton blank produced merely by substituting spacer blocks of various widths for the blocks 170, after the manner in which the scoring die blocks are adjusted. In the present instance this can be readily accomplished by withdrawing the screws 176 which hold the turtles 171A and sliding the same axially to accommodate the width of the new spacer blocks. The adjustment can be made within an exceptionally short time because there is no need to disturb any of the individual blocks 170, 171 which simply remain fixed to their respective turtles.

The bottom closure flaps of cartons such as the one illustrated in Fig. 3 commonly comprise two alternately arranged pairs of different lengths. This is taken advantage of in the present cutting die arrangement to effect a considerable saving of web material. Thus the bottom flaps for two blanks are cut simultaneously from the central portion of the web by the blocks 169 and, due to the complementary relationship of the dies defining the blanks, scrap loss is reduced to a minimum. Furthermore, the fact that the blanks are cut with their relatively regular top edges adjacent the margins of the web makes it possible to reduce scrap loss even more by cutting fairly close to the edges of the web.

By reason of the multiple die block construction used in the machine 50, the possibility of suffering extensive damage due to jamming of the web stock or to passing a foreign object through the rolls is greatly minimized. Even should such an unfortunate occurrence take place, repairs could be quickly and economically made by merely replacing the damaged die sections or blocks.

Power is transmitted from the main driving motor M to the scoring and cutting rolls via a countershaft 178 and a connecting gear train (Figs. 2, 15 and 16). As indicated in the drawings, one terminal member of this gear train constitutes a bevel gear 179 which is driven by a meshing bevel pinion 180 fixed to the shaft 178. The other terminal member of the gear train is in this instance a spur pinion 181 which drivingly meshes with gears 182, 184 fixed respectively upon the supporting shafts of the lower scoring and lower cutting rolls 70A, 71A. The gears 182 and 184, in turn, mesh with substantially identical gears 182A, 184A rigidly fixed upon the respective supporting shafts of the upper scoring and upper cutting rolls 70 and 71 (Fig. 19). To eliminate backlash between the gears 182, 182A and also between the gears 184 and 184A, each of the gears 182A, 184A is equipped with an adjustable toothed annulus 185 which fits into a recess in the inside end face of the gear. It might be noted in passing that the driving gear 182 of the lower scoring roll also meshes with a pinion 183 to drive a pair of draw rolls located adacent the scoring rolls 70, 70A. To permit a phasing adjustment between the entire scoring and cutting assembly and the printing unit 61, a split coupling 186 is interposed in the countershaft 178 which, of course, drives both of the foregoing units. The coupling 186 is made in two angularly adjustable halves 188, 189 which can be clamped relative to each other by means of one or more locking screws 190. The member 188 of the coupling 186 is formed with one or more radial holes for receiving a capstan bar (not shown). To facilitate adjustment of the coupling 186, a flanged hub member 191 is rigidly mounted on the shaft 178 and spaced axially from the coupling 186. Like the member 188, the member 191 also has radial holes for the insertion of a capstan bar. Accordingly, the foregoing adjustment can readily be made by merely loosening the locking screws 190 and rotating the members 188 and 191 with respect to each other by means of a pair of capstan bars.

Provision is made for adjusting the phasing of the individual scoring rolls 70, 70A relative to each other and similarly for adjusting the phasing between the individual cutting rolls, 71, 71A. By the same token, the phasing between the two pairs of scoring and cutting rolls may also be adjusted. This is accomplished in the present instance by splitting each of the roll driving gears 182, 182A and 184, 184A into a toothed portion 192 and a hub portion 194. The portions 192 and 194 are arranged to fit comfortably together for relative angular movement. To preclude such movement after the desired point of adjustment has been reached, a series of drawscrews 195 are arranged to urge the portions 192, 194 together and into tight wedging engagement.

Provision is made for giving intermediate support to that portion of the web passing between the scoring rolls 70, 70A and the cutting rolls 71, 71A. Thus, there is mounted between these two pairs of rolls a fixed supporting plate 196 (Fig. 17) so arranged that the plane of its upper face generally coincides with a common tangent running between the rolls 70A, 71A. Spaced above the plate 196 at a distance slightly greater than the thickness of the web W are a plurality of web guide shoes 198. The latter are suspended from a pair of supporting bars 199 which span the web transversely, the shoes 198 being arranged in axially spaced relationship upon such bars. In the vicinity of each of the shoes 198, the supporting bars 199 are of somewhat enlarged diameter and, in addition, are grooved eccentrically as at 200 in the planes of the respective shoes 198. Since the grooves 200 are of slightly greater width than the shoes 198, each of the latter is arranged for limited upward floating movement. Furthermore, by simply rotating the bars 199 to various angular positions, the attitude of the shoes 198 and the clearance distance between the shoes and the plate 196 can be readily adjusted.

In order to detect bunching or jamming in the web W as the latter passes across the plate 196 and thus permit appropriate steps to be taken to avoid damaging the machine 50, full advantage is taken of the limited vertical floating movement of which the shoes 198 are capable. Referring more specifically to Figs. 16 and 17 it will be noted that a series of electrical switches 201 is disposed in overlying relationship with the shoes 198. To permit actuation of the switches 201 by respective ones of the shoes, a plurality of vertically movable plungers 202 are interposed respectively between each of the shoes 198 and its associated switch 201. The switches 201 can be arranged to actuate an appropriate stop signal or, alternatively, may be connected directly into the dynamic braking circuit of the main driving motor M to provide an automatic emergency stop for the machine 50.

Provision is made for simultaneously separating the upper scoring and upper cutting rolls 70, 71 from the respective lower scoring and lower cutting rolls 70A, 71A. This feature is important not only in making initial setting-up adjustments of the rolls and in threading the web through the machine, but also is of utility in the event of a possible jam of stock in the rolls. To achieve such separation in the exemplary machine 50, a pair of eccentrically bored sleeves 204 (Figs. 7, 11 and 17) is disposed in surrounding relationship with the supporting bearings of each of the upper rolls 70, 71. Each of the sleeves 204 is adapted to be rocked angularly as by the application of tangential force to a pair of radially projecting ears 205. Due to the eccentricity of their bores, the sleeves 204 when rocked will shift their respective rolls 70, 71 vertically to separate the same. In order to attain the simultaneous separation referred to above, the projecting ears 205 of the eccentric supporting sleeves 204 are connected together at each side of the machine by shiftable connecting members 206. Each of the latter comprises an enlarged central section 208 and a connecting link 209 adapted for swivel attachment to the ears 205 as at 210. The enlarged portions 208 of respective pairs of links on each side of the machine are journaled on eccentrics 211 rigidly fixed adjacent the end portions of an adjusting shaft 212 which spans the machine transversely. The shaft 212 is journaled in a pair of upstanding extensions 214 of the side frame panels 69 and is provided at one end with a short polygonal extension 215 which is engageable by an adjusting wrench. It can thus be appreciated that rocking of the shaft 212 will serve to shift the connecting members 206 simultaneously and in longitudinal direction so as to separate or bring together the upper and lower scoring rolls as well as the upper and lower cutting rolls. The rocking movement of the shaft 212 is limited to approximately 180 degrees as a result of engagement between a stop pin 216 mounted on one of the frame extensions 214 and a shouldered collar 218 keyed to the shaft 212.

The extent of separation of the scoring rolls can be determined independently of the separation of the cutting rolls. This is conveniently achieved by making each of the connecting members 206 of adjustable length.

Scrap stripper

As indicated earlier herein, the above mechanism comprises the rolls 72, 72A journaled in bearings supported by the side frame panels 69. The rolls 72, 72A in this instance are driven in timed relation with the scoring and cutting rolls from the gear 184 of the lower cutting roll, via a double pinion 219 (Figs. 19 and 21). The latter drivingly meshes with a gear 220 keyed on the supporting shaft of the lower roll 72A, the gear 220 in turn meshing with gear 220A keyed to the supporting shaft of the upper roll 72. As in the case of the cutting and scoring roll drive gears 182, 182A, 184, 184A, a split construction is utilized in the gears 220, 220A to provide a phasing adjustment for each of the stripper rolls 72, 72A. In addition, the gear 220A has incorporated therein an anti-backlash feature similar to that of the gears 182A, 184A.

Upon reflection, it will be remembered that the web W has been drastically weakened but not completely severed along the lines impressed therein by the cutting rolls 71, 71A. Consequently, the web will be presented to the stripper rolls 72, 72A with the scraps GS, RS, PS, and R still held in place but by a layer of material having a thickness which is only a small fractional part of the total web thickness.

For the purpose of stripping from the web W the glue lap scraps GS and the bottom flap relief scraps RS, both of which lie in the central portion of the web, there is provided a pair of relatively heavy collars 221, 221A keyed respectively to the rolls 72, 72A as at 222 and positioned centrally of the rolls. At diametrically opposed points on the collar 221 are mounted a pair of punching dies 224 each having a cross section slightly smaller than that of the scraps GS (Figs. 21 and 24). Spaced circumferentially on the collar 221 and at 90 degrees to the plane of the dies 224 is a second pair of punching dies 225 each having a cross section slightly smaller than that of the scraps RS. Mounted circumferentially on the collar 221A and disposed in mutually perpendicular planes are two additional pairs of dies 226, 228. The dies 226 in this instance are formed with undercut rectangular slots of slightly larger size than the cross section of the scraps GS, while the dies 228 have similar slots also of somewhat greater size than the scraps RS. By proper phasing adjustment of the rolls 72, 72A, the dies 224, 226 are adapted to register with each other and also with the scraps GS, punching the latter out of the web and into the slots of the dies 224. Similarly, with rotation of the rolls 72, 72A, the dies 225, 228 coact to punch the scraps RS out of the web and into the slots of the dies 228.

To effect removal of the pouring tab relief scrap PS and the marginal ribbon scrap R, two additional pairs of collars 229, 229A are disposed upon the rolls 72, 72A in axially spaced relation with the collars 221, 221A so as to flank the latter. Like the collars 221, 221A, the collars 229, 229A are keyed to the stripper rolls as at 222 and are susceptible of being retained in various axial positions by reason of clamps 230, 231. At diametrically opposed points on the collars 229 there are mounted punching dies 232 (Figs. 21, 23 and 25) having radial projections somewhat smaller in cross section than the size of the scraps PS. Mounted on the collars 229A and adapted to cooperate with the dies 232 to remove the scraps PS from the web are a pair of dies 234 suitably recessed (Fig. 26) to receive such scraps as they are pushed out of the plane of the web. For removing the ribbon scrap R, the collars 229 are each equipped with circumferentially spaced sets of segmental blocks 235, 236 fixed to the outer radial faces thereof and adapted to move across the peripheral portions of the outer radial faces of the cooperating collars 229A. Thus with the rotation of the rolls 72, 72A, the blocks 235, 236 contact the ribbon scraps R as indicated in Fig. 22 and press the same downwardly with a combined shearing and tearing action to sever such scraps from the web. The severed ribbons are removed from the machine 50 by means of a suction collector 238 indicated generally in Fig. 27.

In order to remove the scraps GS, RS and PS which collect in the respective slots of the dies 226, 228 and 234, a stripper finger arrangement is utilized in conjunction with the collars 221A and 229A. The latter are accordingly fashioned with annular grooves 239, 240 running transversely of the slots in the foregoing dies. Adjustably mounted on a common supporting bar 241 and disposed tangentially of the bottom surfaces of the grooves 239, 240 are a plurality of stationary extractor fingers 242. The latter are adapted, upon rotation of the collars 221A and 229A, to dislodge the scraps from the slots of the dies and thus permit such scraps to pass into the suction collector 238.

With the die spacing described above, it becomes possible to make the collars 221, 221A and 229, 229A, half the diameter of the scoring and cutting rolls and yet capable of processing blanks at the same rate as these rolls. This is accomplished by driving the stripper rolls 72, 72A at twice the rotational speed of the scoring and cutting rolls. The peripheral speed of the collars and dies carried by the rolls 72, 72A is, however, equal to the linear speed of the web W as it passes through the machine 50.

Separating and stacking means

The web W, as presented to the separating and stacking means 74 by the scrap stripper rolls 72, 72A, consists of a series of carton blanks connected to each other along weakened parting lines impressed therein by the cutting rolls 71, 71A in the manner described above. The separating and stacking means 74, as outlined earlier herein, is adapted to completely sever the blanks, to gather them in overlapping relationship, and finally to deliver them in such condition for removal from the machine 50 at rates which may run in the neighborhood of 1000 per minute.

Provision is made for simultaneously separating, both laterally and longitudinally, completed blanks which are still attached to the web. This is accomplished in the present instance by means of coacting separator rolls 244, 244A arranged in two groups, one on each side of the center line of the web (Figs. 27, 28). The separator rolls of each group are journaled for rotation upon an axis which is canted rearwardly with respect to the direction of web travel. To enhance their gripping action upon the blanks, the peripheral portions of the rolls 244, 244A may be made of any suitable frictional material such as rubber. Power is supplied to the rolls 244, 244A from an independently controlled driving motor M-1 via a belt 245 and a pair of vertically spaced transverse shafts 246 geared together as by pinions 248. The shafts 246, in turn, drive the rolls 244, 244A individually through a plurality of short belts 249. In operation, the rolls 244, 244A are driven at a substantially higher peripheral speed than the scrap stripper rolls 72, 72A, thus accelerating each of the blanks and causing it to part from the one immediately following it. At the same time, a component of lateral acceleration will be imparted to each blank, causing it to part from the one laterally adjacent to it. As a result of the foregoing action, the blanks are separated from the web into two laterally spaced rows.

Upon acceleration by the rolls 244, 244A, the separated blanks travel for a short distance in a free trajectory, eventually being channeled toward the gathering means by a plurality of stationary guide shoes 250. The latter means comprises a moving bed of gathering belts 251, together with a coacting series of gathering rolls 252 adapted to move at a peripheral speed equal to that of the belts 251. Since the peripheral speed of these members is normally lower than that of the rolls 72, 72A, the blanks will tend to accumulate in overlapping relationship on the belts 251 and in such condition will be deposited upon a delivery conveyor belt 254. At intervals along its length, the weight of the belt 254 is carried by a plurality of supporting rollers 255.

The delivery conveyor belt 254 as well as the gathering belts 251 and the gathering rolls 252 are driven from a common power source which, in the present instance, comprises an independently controlled motor M-2. The latter is arranged to drive a sprocket wheel 256 through a suitable speed reduction unit 258. Drivingly connected to the sprocket wheel 256 by means of a chain 259 is a second sprocket wheel 260 rigidly fixed to the supporting shaft 261 of a main driving roller 262 which serves to move the conveyor belt 254. Mounted on a supporting shaft 264 running transversely of the belt 254 is a roller 265 which is rotated by the conveyor belt 254. As indicated in Fig. 27, the belt 254 is led from the driving roller 262 over the roller 265 and thence to a tensioning idler roller 266. Rigidly fixed to the respective shafts 261 and 264 of the rollers 262 and 265 but located on the opposite side of the conveyor belt 254 from the sprocket wheel 260 are a pair of sprocket wheels 268 and 269. The wheels 268 and 269 mesh with a chain 270 which drives another sprocket wheel 271 fixed to gathering roll supporting shaft 272. Tension in the chain 270 can be regulated by adjusting the position of an idler sprocket 274. At the end opposite the sprocket wheel 271, the gathering roll supporting shaft 272 has fixed thereto a pinion 275 which drivingly meshes with a mating pinion 276 journaled in a bracket 278. Unitary with the pinion 276 is a driving pulley 279 which is connected as by means of a V-belt 280 to a similar driven pulley 281, the latter being rigidly secured upon shaft 282 which drives the gathering belts 251.

To permit adjustment of the inclination of the gathering belts 251, the gathering belt drive shaft 282 is supported in a pair of laterally spaced end brackets 284. The latter are adapted to pivot about the axis of the gathering roll supporting shaft 272 and are provided with depending arms 285 which can be adjustably clamped to the frame of the machine in any convenient manner as by nut-and-bolt assemblies in slots 286. By reason of a rigid connection between the bracket 278 and one of the brackets 284, the former moves with the latter when the same is rockably adjusted.

Depending upon the ratio of the peripheral speed of the gathering belts and rolls 251, 252 to the peripheral speed of the scrap stripper rolls 72, 72A, a controllable number of blanks will lie in overlapping relationship on the gathering belts 251 at any particular instant. The number of blanks thus accumulated will, of course, vary directly with the difference in these peripheral speeds. In order to permit the presentation of a variable number of blanks from the gathering belts and rolls 251, 252 to the delivery conveyor belt 254, provision is made for automatically separating the belts 251 and the rolls 252 to accommodate one or more blank thicknesses. Furthermore, these members will continue to rotate at the same peripheral speed regardless of such separation. This is accomplished in the present instance by mounting the gathering belts 251 upon a frame comprising a plurality of bracket arms 288 spanned by a suitable stiffener bar 289. The arms 288 are journaled for limited rocking movement about the axis of the gathering belt drive shaft 282. To urge the belts 251 yieldably against the overlying gathering rolls 252, one or more of the bracket arms 288 is fashioned with a depending arm 289 which carries a suitable biasing weight 290. By proper proportioning of these parts, the yieldable force between the belts 251 and the rolls 252 can be adjusted to effect automatically whatever degree of separation might be required to accommodate the variable number of blanks passing therebetween. Since the belts 251 merely swing about the axis of their driving shaft 282 upon separation from the rolls 252, their peripheral speed, of course, remains unaffected regardless of the degree of separation.

*Synopsis of operation*

While it is believed that the operation of the machine 50 is already clear to those skilled in the art, a brief summary might be helpful at this point. Recapitulating, it will be recalled that the web W of paperboard or similar sheet material is supplied to the machine from the roll 52, the initial web tension being regulated by means of the friction brake 55. From the roll 52, the web is led in succession through the splice detector 81, down past the splice bed 82, and then over the decurler roll 110 which is interposed between the drawrolls 108, 109. From here the web is fed into the printing unit 61, passing from the latter under the ink drier 65 and thence into the scoring and cutting assembly 68 via a pair of drawrolls. The necessary fold lines in the blanks are impressed upon the web by the scoring rolls 70, 70A which operate in registration with any previously applied printed matter. After leaving the scoring rolls, the web is processed by the cutting rolls 71, 71A, which impress the necessary lines in the web to complete the definition of the blanks, such lines being applied in registration with the printed material and the score lines already in the web. Upon subsequent contact with the scrap stripper rolls 72, 72A the scrap portions are completely removed from the web and the latter is consequently presented to the separating rolls 244, 244A as a series of completely defined, connected blanks. The rolls 244, 244A accelerate the blanks simultaneously in both lateral and longitudinal directions to effect complete separation from the web, projecting the severed blanks toward the gathering belts and rolls 251, 252 in two laterally spaced rows. Since the gathering belts and rolls move at a lower peripheral speed than that of the scrap stripper rolls 72, 72A, the blanks will accumulate on the gathering belts in overlapping relation and in such condition will be presented to the delivery conveyor belt 254. This belt, in turn, merely transports the blanks in two laterally spaced rows to a delivery station where they are removed from the machine.

We claim as our invention:

1. In a carton converting machine adapted to receive a continuously moving web of paperboard and to produce therefrom a series of completely severed carton blanks having scored folding lines and printed indicia accurately located relative thereto, the combination of means for supplying a web under tension to said machine, a decurler roll for neutralizing residual curvature in the web, means for printing identifying indicia at spaced intervals on the web, scoring and cutting rolls adapted to define a double row of incompletely cut and unsevered carton blanks in the web, said rolls being driven in timed relation with each other and with said printing means said cutting rolls being adapted to bite into said web but to stop short of complete severance, stripper rolls driven at the same peripheral speed as said scoring and cutting rolls and adapted to register with the scrap portions of the web for removal of such portions, separator rolls adapted to accelerate each row of unsevered blanks simultaneously in both a lateral and longitudinal direction causing the rows of blanks to part from each other and the blanks of each row to part from each other, gathering belts and rolls arranged to move at a lower peripheral speed than said stripper rolls, said gathering belts and rolls being adapted to accumulate severed blanks in overlapping relationship and to present the same to a delivery conveyor belt for removal from said machine.

2. In a carton converting machine adapted to receive a continuously moving web of paperboard or the like and to produce therefrom a series of completely severe carton blanks; the combination of means for supplying a web under tension to said machine, scoring and cutting rolls adapted to define carton blanks in the web, said rolls being driven in timed relation with each other, said cutting rolls being adapted to effect partial but not complete severance of said blanks from each other, stripper rolls arranged for movement at a peripheral speed corresponding to the linear speed of the web and adapted to register with the scrap portions of the latter for removal of such portions, separator rolls adapted to frictionally grip each unsevered blank and accelerate the same simultaneously in both a lateral and longitudinal direction causing such blank to part from the web, gathering belts and rolls arranged to move at a lower peripheral speed than said stripper roll and means for gathering severed blanks in overlapping relationship for presentation to the moving belt of a delivery conveyor.

3. In a machine for converting a web of sheet material into carton blanks, the combination of means for supplying a continuously moving web of material to said machine, a pair of scoring rolls, die blocks rigidly fixed to said scoring rolls for embossing the web with score lines to partially define carton blanks therein, a pair of cutting rolls, die blocks fixed to one of said cutting rolls and adapted to impress parting lines in the web to further define carton blanks therein, and angularly adjustable drive gears connected with certain ones of said scoring and cutting rolls and adapted to effect a suitable phasing adjustment between the die blocks of individual rolls and also between said pairs of rolls, each said adjustable driving gear having a hub portion and a toothed portion susceptible of mutual angular adjustment together with means for wedgingly securing said portions in adjusted relation.

4. In a machine for converting a web of sheet material into carton blanks, the combination of means for supplying a continuously moving web of material to said machine, printing means arranged to apply signatures at intervals on the web, a pair of scoring rolls, die blocks rigidly fixed to said scoring rolls for embossing the web with score lines to partially define carton blanks therein, a pair of cutting rolls, die blocks fixed to one of said cutting rolls and adapted to impress parting lines in the web to further define carton blanks therein, angularly adjustable drive gears connected with certain ones of said scoring and cutting rolls and adapted to effect a suitable phasing adjustment therebetween, each said adjustable drive gear having tapered component elements wedgingly secured in adjusted position, and an angularly adjustable driving connection between said printing means and said scoring and cutting rolls, said connection being adapted to effect any desired phasing adjustment between said printing means and said scoring and cutting rolls, said connection also having tapered component elements wedgingly secured in adjusted position.

5. In a machine for converting a web of sheet material into carton blanks, the combination of means for supplying a continuously moving web of material to said machine, printing means arranged to apply signatures at intervals on the web, a pair of scoring rolls arranged to emboss the web with score lines and thus to partially define carton blanks therein, a pair of cutting rolls adapted to impress parting lines in the web to completely define carton blanks and scrap portions therein, a pair of stripper rolls arranged to remove the scrap portions from the web, angularly adjustable drive gears connected with certain ones of said rolls for effecting a suitable phasing adjustment therebetween, each said driving gear having a hub portion and a toothed portion susceptible of mutual angular adjustment, means for wedgingly securing each said hub and tooth portion in adjusted relation, and an angularly adjustable driving connection between said printing means and said pairs of rolls for effecting any desired phasing adjustment between the latter and said printing means, said connection having tapered component elements wedgingly secured in adjusted relation.

6. In a machine for converting a moving web of sheet material into carton blanks, the combination comprising a pair of scoring rolls, die blocks rigidly fixed to said scoring rolls for defining score lines in the web, a pair of cutting rolls spaced from said scoring rolls longitudinally in the direction of web travel, die blocks carried by one of said cutting rolls and adapted to coact with the other of said rolls to impress parting lines in the web, bearer flanges adapted to define a uniform working clearance between the respective rolls in said pairs, and means including eccentric elements surrounding the bearings of one said roll in each said pair for effecting simultaneous separation of the respective rolls in said pairs.

7. In a machine for converting a moving web of sheet material into carton blanks, the combination of a pair of scoring rolls for defining score lines in the web, a pair of cutting rolls spaced from said scoring rolls longitudinally in the direction of web travel, said cutting rolls being adapted to impress parting lines in the web, bearer flanges adapted to define a working clearance between the respective rolls in said pairs, and a single actuating element and means controlled thereby for effecting simultaneous separation of the respective rolls in said pairs.

8. In a carton converting machine of the character set forth, the combination comprising a pair of scoring rolls, scoring dies carried by said rolls, bearer flanges unitary with said rolls, the bearer flanges of one of said rolls having rolling contact with those of the other of said rolls and thus determining the minimum working clearance between said scoring dies, a pair of cutting rolls, cutting dies fixed to one of said cutting rolls, bearer flanges unitary with one of said cutting rolls and having rolling contact with the other of said rolls so as to determine the minimum working clearance between said cutting dies of said one roll and the surface of said other cutting roll, individually adjustable means for effecting relative separation of the supporting bearings of the rolls in each of said pairs, and a single actuating element linking all of said individually adjustable means and arranged to permit simultaneous separation of the rolls in each of said pairs.

9. In a carton converting machine of the character set forth, the combination comprising a pair of scoring rolls, means for supplying a continuously moving web of sheet material to said pair of scoring rolls, and die blocks mounted on said rolls and including central die blocks adapted to impress a score line in the web defining the lower boundary of the side panels in a carton blank, outside die blocks adapted to impress a pattern of score lines in the web defining the top boundary of the side panels of the blank, and intermediate spacer die blocks interposed between said central and said outside die blocks to define score lines between adjacent side panels of the carton blank, the width of said intermediate blocks measured axially of said rolls serving to determine the size of the carton blank produced by said scoring rolls.

10. In a carton converting machine, the combination comprising a pair of scoring rolls, means for supplying a web of sheet material to said pair of scoring rolls, a set of die blocks mounted centrally of said rolls and adapted to impress a score line in the web defining the lower boundary and portions of the side boundaries of the side panels in a carton blank, a second set of die blocks mounted adjacent the ends of said rolls and adapted to impress a pattern of score lines in the web defining the top boundary and a portion of the side boundaries of the side panels of the blank, and a set of spacer die blocks mounted on said rolls between said first and second sets of die blocks to define score lines between adjacent side panels of the carton blank, the dimension of said spacer blocks axially of said rolls being proportional to the size of the carton blank produced by said rolls.

11. In a carton converting machine of the character set forth, the combination comprising a pair of cutting rolls, means for supplying a continuously moving web of sheet material to said pair of cutting rolls, and die blocks mounted on said cutting rolls including central die blocks adapted to impress a parting line in the web defining the perimeters of the bottom closure flaps in a carton blank, outside die blocks adapted to impress a parting line in the web defining the outer perimeter of the top closure panels of the blank, and intermediate spacer die blocks interposed between said central and said outside die blocks to impress parting lines in the web between the side panels of successive carton blanks, the width of said intermediate blocks measured axially of said rolls serving to determine the height of the side panels and hence the size of the carton blank defined by said cutting rolls.

12. In a carton converting machine, the combination comprising means for supplying a web of sheet material, a pair of scoring rolls, a pair of cutting rolls, a first series of die blocks mounted centrally of said rolls and adapted to define in the web the bottom closure flaps and portions of the side panels of a carton blank, a second series of die blocks mounted adjacent the ends of said rolls and adapted to define in the web the top closure panels and a portion of the side panels of the blank, and a series of spacer die blocks mounted on said rolls between said first and second series of die blocks and adapted to define substantial portions of the side panels of the carton blank, said second series of die blocks being adjustably positionable on said rolls and said spacer die blocks being replaceable with others to vary the size of the carton blanks produced by said rolls.

13. In a carton converting machine, the combination of means for supplying a web of sheet material, upper and lower scoring rolls, upper and lower cutting rolls, a first series of ribbed die blocks mounted centrally of said upper rolls and adapted to define in the web in cooperation with said lower rolls the bottom closure flaps and portions of the side panels of a carton blank, a second series of ribbed die blocks mounted as a rigid unit on arcuate supporting plates detachably secured outwardly of said first series on said upper rolls, said second series being adapted to define in the web in cooperation with said lower rolls the top closure panels and a portion of the side panels of the blank, and a series of ribbed spacer die blocks mounted on said upper rolls between said first and second series of die blocks and adapted to define substantial portions of the side panels of the carton blank, said second series of die blocks and said arcuate supporting plates being positionable as units axially of said upper rolls, said spacer die blocks being replaceable with others of various axial widths to vary the size of the carton blanks produced by said rolls.

14. In a machine for converting into side-by-side processions of carton blanks a moving web of sheet material such as paperboard or the like, the combination of a cutting roll, die blocks mounted on the central portion of said roll, cutting ribs unitary with said die blocks, said ribs being spaced and adapted to define in the web simultaneously the bottom flaps of two adjacent blanks, said bottom flaps of respective blanks being of unequal length and interlaced longitudinally of the web so as to completely eliminate waste material between the ends thereof.

15. In a carton converting machine, the combination comprising scoring and cutting rolls engageable with the web and adapted to convert the same into a series of carton blanks and a series of scraps connected to the latter, a pair of stripper rolls adapted to be driven at the same peripheral speed as said scoring and cutting rolls, punching dies carried by one of said stripper rolls, dies carried by the other of said stripper rolls and having recesses therein, said dies being adapted upon rotation of said stripper rolls to coact in registration with respective scraps in the web so as to punch the same into the recesses of the dies of said other stripper roll, said other stripper roll and said dies thereon having a plurality of circumferential grooves therein, and a plurality of stationary extractor fingers disposed in projecting relation within said circumferential grooves of said other stripper roll and adapted to remove the scraps from the recesses of the dies thereon.

16. In a carton converting machine, the combination of means for defining a series of unsevered carton blanks in a web of sheet material, separator rolls adapted to receive said web of unsevered blanks and being canted transversely to the path of the web to accelerate each of said blanks simultaneously in both a lateral and a longitudinal direction causing the same to part from the web, gathering means arranged to move at a lower peripheral speed than the linear speed of the web as the same is presented to said separator rolls, said gathering means being adapted to accumulate severed blanks in overlapping relation and to present the same to a delivery conveyor belt for removal from said machine.

17. In a carton converting machine, the combination of means for defining a series of unsevered carton blanks in a web of sheet material, separator rolls journaled on transverse axes having their outer ends inclined rearwardly to the direction of web travel, said separator rolls being adapted to receive said web of unsevered blanks and to separate blanks therefrom into two laterally spaced rows, gathering means arranged to move at a lower peripheral speed than the linear speed of the web as the same is presented to said separator rolls, said gathering means being adapted to accumulate the severed blanks in overlapping relation and in the two laterally spaced rows for presentation to a delivery conveyor belt.

18. In a carton converting machine, the combination comprising means for defining a series of unsevered carton blanks in a web of sheet material, separator rolls adapted to receive the web of unsevered blanks and to separate blanks therefrom, a plurality of gathering belts, gathering rolls operatively associated with said gathering belts and arranged to receive severed blanks from said separator rolls, the blanks accumulating in overlapping relation on said belts, and means for yieldably urging said gathering belts and gathering rolls together, said yieldable means being adapted to permit automatic separation of said gathering belts and gathering rolls to accommodate varying thicknesses of accumulated blanks.

19. In a carton converting machine, the combination of means for defining a series of unsevered carton blanks in a web of paperboard or the like, separator rolls adapted to receive the web of unsevered blanks and to separate blanks therefrom, a plurality of gathering belts, gathering rolls operatively associated with said gathering belts and arranged to be driven at the same peripheral speed as said belts, the latter being adapted to accumulate blanks in overlapping relation thereon, and means for yieldably urging said gathering belts and gathering rolls together, said yieldable means being adapted to permit automatic separation of said gathering belts and gathering rolls to accommodate varying thicknesses of blanks passing therebetween, the peripheral speeds of said belts and gathering rolls remaining identical regardless of the degree of separation between them.

20. In a machine for converting into carton blanks a web of paperboard or the like, the combination of scoring and cutting rolls engageable with the web and adapted to convert the same into a series of blanks and a series of scraps connected thereto, a pair of stripper rolls driven in timed relation with said scoring and cutting rolls, one of said stripper rolls having a punching die, the other of said stripper rolls having a shearing die, said dies being adapted upon rotation of said stripper rolls to register with respective scraps in the web so as to remove the same, said other of said stripper rolls and said shearing die having at least one circumferential slot therein, and an extractor finger disposed in projecting relation within said slot.

References Cited in the file of this patent

UNITED STATES PATENTS

| Number | Name | Date |
|---|---|---|
| 136,246 | Jaeger | Feb. 25, 1873 |
| 372,624 | Jaeger | Nov. 1, 1887 |
| 569,957 | Corkhill, Jr. | Oct. 20, 1896 |
| 630,596 | Cowell | Aug. 8, 1899 |
| 738,528 | Cowell | Sept. 8, 1903 |
| 972,300 | Vavra | Oct. 11, 1910 |
| 1,183,744 | Leach | May 16, 1916 |
| 1,298,939 | Harris et al. | Apr. 1, 1919 |
| 1,428,952 | Furh | Sept. 12, 1922 |
| 1,482,353 | Dausmann | Jan. 29, 1924 |
| 1,540,831 | De Moos | June 9, 1925 |
| 1,592,094 | Funk | July 13, 1926 |
| 1,742,335 | Willsea | Jan. 7, 1930 |
| 1,769,883 | Langston | July 1, 1930 |
| 1,832,481 | Gebhart | Nov. 17, 1931 |
| 1,850,071 | Boyer | Mar. 22, 1932 |
| 1,850,800 | Langston et al. | Mar. 22, 1932 |
| 1,850,801 | Langston et al. | Mar. 22, 1932 |
| 1,850,802 | Langston et al. | Mar. 22, 1932 |
| 1,864,231 | Canning | June 21, 1932 |
| 1,865,479 | Mueller | July 5, 1932 |
| 1,874,013 | Kaddeland | Aug. 30, 1932 |
| 1,962,815 | Goffin | June 12, 1934 |
| 1,977,812 | Swift, Jr. | Oct. 23, 1934 |
| 1,979,985 | Moone | Nov. 6, 1934 |
| 2,035,857 | Adsit | Mar. 31, 1936 |
| 2,094,896 | Knowlton | Oct. 5, 1937 |
| 2,163,035 | Grupe | June 20, 1939 |
| 2,164,436 | Waters | July 4, 1939 |
| 2,395,352 | Staude et al. | Feb. 19, 1946 |